United States Patent
Kobayashi

(10) Patent No.: US 9,506,766 B2
(45) Date of Patent: Nov. 29, 2016

(54) TECHNIQUES FOR PROVIDING REPLENISHMENT POINT INFORMATION

(71) Applicant: NEC Corporation, Tokyo (JP)

(72) Inventor: Yoshikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 36 days.

(21) Appl. No.: 14/403,980

(22) PCT Filed: May 22, 2013

(86) PCT No.: PCT/JP2013/064236
§ 371 (c)(1),
(2) Date: Nov. 25, 2014

(87) PCT Pub. No.: WO2013/179983
PCT Pub. Date: Dec. 5, 2013

(65) Prior Publication Data
US 2015/0160029 A1   Jun. 11, 2015

(30) Foreign Application Priority Data
May 31, 2012 (JP) .................................. 2012-125363

(51) Int. Cl.
*G06F 19/00* (2011.01)
*G01C 21/34* (2006.01)
(Continued)

(52) U.S. Cl.
CPC ............. *G01C 21/3469* (2013.01); *B60L 3/12* (2013.01); *B60L 11/1816* (2013.01);
(Continued)

(58) Field of Classification Search
USPC ....................................................... 701/32.3
See application file for complete search history.

(56) References Cited

U.S. PATENT DOCUMENTS

2007/0150185 A1   6/2007 Nagase et al.
2010/0094496 A1*   4/2010 Hershkovitz ............. B60L 3/12
701/22
(Continued)

FOREIGN PATENT DOCUMENTS

EP   2365285 A2   9/2011
EP   2447107 A2   5/2012
(Continued)

OTHER PUBLICATIONS

International Search Report corresponding to PCT/JP2013/064236, dated Jul. 16, 2013 (5 pages).
(Continued)

*Primary Examiner* — Adam Tissot
(74) *Attorney, Agent, or Firm* — Wilmer Cutler Pickering Hale and Dorr LLP

(57) ABSTRACT

A portable communication terminal includes a current location/destination information acquirer that acquires current location information and destination information of a vehicle, a power source level information acquirer that acquires, from the vehicle, power source level information representing a remaining level of a power source, and a first transmitter that transmits the current location information, the destination information, and the power source level information to a server. A server includes a first receiver that receives, from the first transmitter, the current location information, the destination information, and the power source level information, an accumulator that accumulates past driving history information using the vehicle and a plurality of replenishment enable points representing positions where the power source of the vehicle can be replenished, a selector that selects, based on the current location information, the destination information, and the power source level information, which are received, and the accumulated driving history information, a replenishment point representing a position where the power source of the vehicle should be replenished from the plurality of replen- (Continued)

ishment enable points, and a second transmitter that transmits information about the selected replenishment point to the portable communication terminal.

31 Claims, 35 Drawing Sheets

(51) Int. Cl.
*B60L 11/18* (2006.01)
*B60L 3/12* (2006.01)
*G07C 5/08* (2006.01)
*G08G 1/01* (2006.01)
*G08G 1/0968* (2006.01)
*G08G 1/0969* (2006.01)

(52) U.S. Cl.
CPC .......... *B60L 11/1838* (2013.01); *G07C 5/0808* (2013.01); *G08G 1/0112* (2013.01); *G08G 1/0129* (2013.01); *G08G 1/0141* (2013.01); *G08G 1/0969* (2013.01); *G08G 1/096816* (2013.01); *G08G 1/096838* (2013.01); *Y02T 10/7005* (2013.01); *Y02T 10/7072* (2013.01); *Y02T 90/14* (2013.01); *Y02T 90/16* (2013.01); *Y02T 90/161* (2013.01)

(56) References Cited

U.S. PATENT DOCUMENTS

2011/0224900 A1* 9/2011 Hiruta ................ G01C 21/3469
701/533

| | | | |
|---|---|---|---|
| 2011/0282527 A1 | 11/2011 | Inbarajan et al. |
| 2011/0288721 A1 | 11/2011 | Christensen et al. |
| 2011/0306389 A1 | 12/2011 | Nagayama |
| 2012/0016576 A1 | 1/2012 | Huang et al. |
| 2012/0109409 A1 | 5/2012 | Hara |

FOREIGN PATENT DOCUMENTS

| | | | |
|---|---|---|---|
| JP | 2005-017194 A | 1/2005 |
| JP | 2006-112932 A | 4/2006 |
| JP | 2007-178126 A | 7/2007 |
| JP | 2007-193788 A | 8/2007 |
| JP | 2007-195144 A | 8/2007 |
| JP | 2007-195160 A | 8/2007 |
| JP | 2008-003093 A | 1/2008 |
| JP | 2008-026960 A | 2/2008 |
| JP | 2008-283698 A | 11/2008 |
| JP | 2008-309794 A | 12/2008 |
| JP | 2009-010948 A | 1/2009 |
| JP | 2010-032459 A | 2/2010 |
| JP | 2011-185785 A | 9/2011 |
| JP | 2011-214895 A | 10/2011 |
| JP | 2011-259253 A | 12/2011 |
| JP | 2012-120218 A | 6/2012 |
| JP | 2012-225933 A | 11/2012 |

OTHER PUBLICATIONS

Extended European Search Report corresponding to European Application No. 13797441.6, dated Dec. 14, 2015, 8 pages.

* cited by examiner

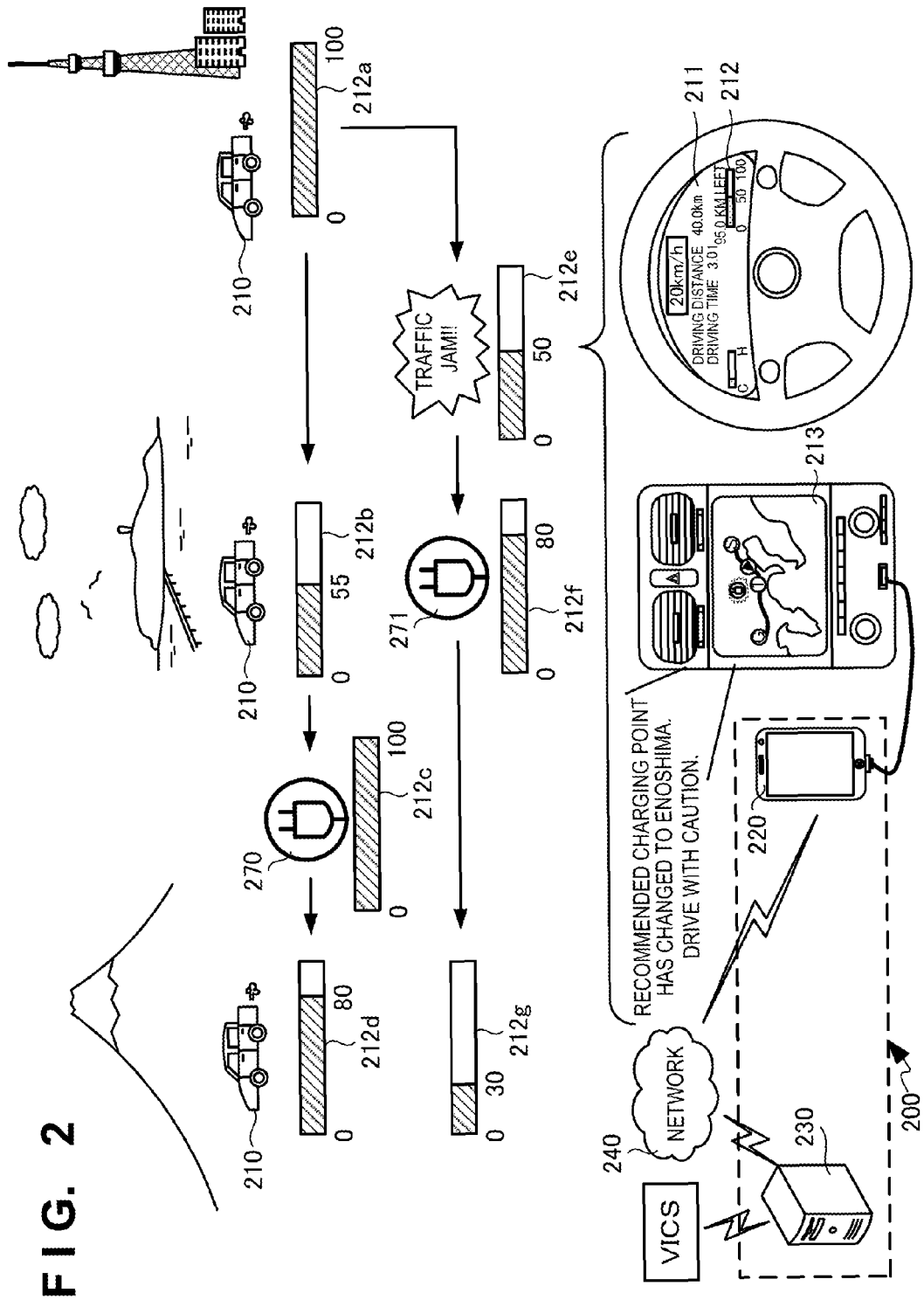

350

| CHARGING ENABLE POINT | AREA | ATTRIBUTE | ELECTRICITY RATE (YEN/KWh) |
|---|---|---|---|
| 1001 | TOWN | CONVENIENCE STORE | 15.6 |
| 1002 | TOWN | FAMILY RESTAURANT | 15.6 |
| 1003 | TOWN | CITY HALL | 0 |
| ⋮ | ⋮ | ⋮ | ⋮ |
| 2101 | EXPRESSWAY | △△SA | 20.6 |
| 2102 | EXPRESSWAY | ○○PA | 20.6 |
| ⋮ | ⋮ | ⋮ | ⋮ |
| 1011 | SUBURB | FAMILY RESTAURANT | 15.6 |
| 1012 | SUBURB | FAMILY RESTAURANT | 0 |
| ⋮ | ⋮ | ⋮ | ⋮ |

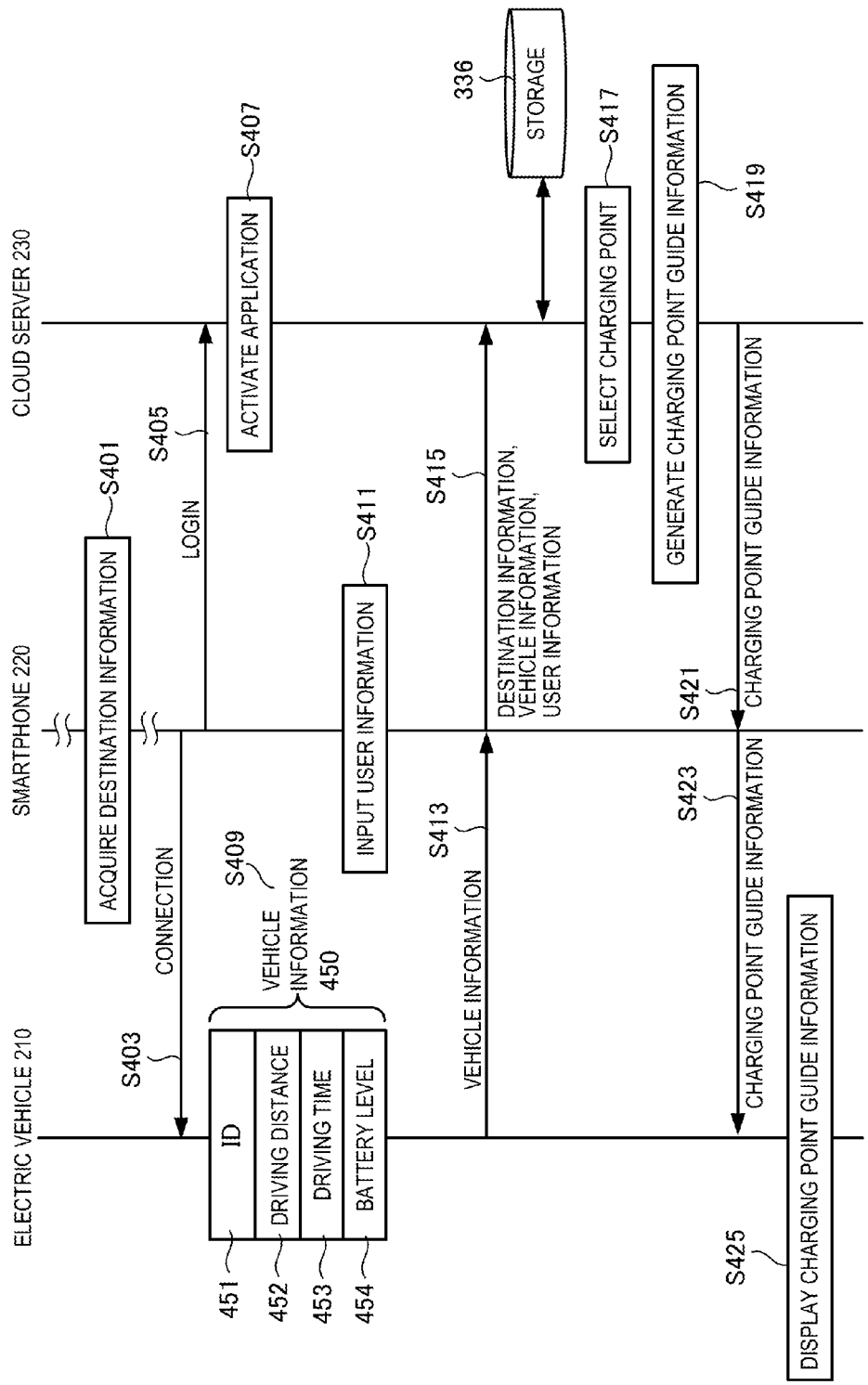

MODEL    KATO PULSAR EV, 20**

| USER ID | TIMING | AREA | DRIVING ROUTE | ATTRIBUTE | AVERAGE SPEED km/h | POWER CONSUMPTION kWh |
|---|---|---|---|---|---|---|
| 50A25PM0 (USER) | 2012/04/29 | TOWN | HOME~○○ CONVENIENCE STORE | | 20.3 | 3.6 |
| | 2012/04/30 | URBAN DISTRICT | HOME~MT. TAKAO | | 32.5 | 10.8 |
| | 2012/05/03 | TRAFFIC JAM | HOME~△△ZOO | CONVENIENCE STORE, FAMILY RESTAURANT | 29.3 | 13.5 |
| | 2012/05/04 | TOURIST AREA | HOME~ ○○HOT SPRINGS××HOTEL~ | | 39.0 | 27.0 |
| | 2012/05/05 | TOURIST AREA | ○○HOT SPRINGS××HOTEL~ □□ART MUSEUM | | 32.1 | 8.1 |
| | ... | ... | ... | ... | ... | ... |
| 31B66QM0 (WIFE) | 2012/04/16 | | COMPANY~DRUGSTORE | | 21.8 | 10.44 |
| | 2012/04/17 | | COMPANY~△△SUPERMARKET | SUPERMARKET, DRUGSTORE | 26.0 | 10.42 |
| | ... | ... | ... | ... | ... | ... |
| ... | | | | | | |

610

F I G.  6A

620
| MODEL | AREA | TIMING | MILEAGE km/KWh | VARIATION |
|---|---|---|---|---|
| A | TOWN | DAYTIME WEEKDAY | 5.5 | 1.1 |
| | | DAYTIME HOLIDAY | 5.8 | 1.0 |
| | | NIGHTTIME | 8.2 | 1.2 |
| | EXPRESSWAY | DAYTIME WEEKDAY | 6.4 | 1.5 |
| | | DAYTIME HOLIDAY | 6.7 | 1.3 |
| | | NIGHTTIME | 9.2 | 1.1 |
| | SUBURB | DAYTIME WEEKDAY | 6.0 | 1.5 |
| | | DAYTIME HOLIDAY | 6.2 | 1.3 |
| | | NIGHTTIME | 8.9 | 1.0 |
| | ⋮ | | | |
| B | EXPRESSWAY | DAYTIME WEEKDAY | 5.8 | 1.0 |
| | | DAYTIME HOLIDAY | 6.0 | 1.3 |
| | | NIGHTTIME | 7.8 | 1.5 |
| | ⋮ | | | |
| ⋮ | | | | |
F I G. 6B

| DRIVING DATE/TIME INFORMATION / VEHICLE ID | DRIVING RECORD | DRIVING DATE | DRIVING TIME ZONE | MILEAGE (km/KWh) | VARIATION |
|---|---|---|---|---|---|
| 101101A | D1 | 2011/01/02 | AM 8:54~AM11:20 | 5.5 | 1.5 |
| | ... | ... | ... | ... | ... |
| | Dn | | | | ... |
| 101101B | D1 | 2011/12/20 | AM 11:25~PM 4:01 | 5.9 | 1.6 |
| | ... | ... | ... | ... | ... |
| | D6 | 2012/04/04~04/05 | PM 10:55~AM 1:15 | 8.0 | 1.2 |
| ... | | | | | ... |

| VEHICLE MAINTENANCE INFORMATION / VEHICLE ID | MAINTENANCE RECORD | TIRE PRESSURE | TIRE WEAR LEVEL | TIRE EXCHANGE TIME | OIL AMOUNT | OIL CONTAMINATION | OIL EXCHANGE TIME | MILEAGE (km/KWh) | VARIATION |
|---|---|---|---|---|---|---|---|---|---|
| 101101A | M1 | ... | ... | ... | ... | ... | ... | 5.5 | 1.5 |
|  | ... | ... | ... | ... | ... | ... | ... | ... | ... |
|  | Mn | ... | ... | ... | ... | ... | ... | ... | ... |
| 101101B | M1 | ... | ... | ... | ... | ... | ... | 5.9 | 1.6 |
|  | ... | ... | ... | ... | ... | ... | ... | ... | ... |
|  | M6 | ... | ... | ... | ... | ... | ... | 8.0 | 1.2 |
| ... | ... | ... | ... | ... | ... | ... | ... | ... | ... |

750

| VEHICLE ID | DRIVING RECORD D | ENVIRONMENT RECORD E | TRAFFIC RECORD T | VEHICLE RECORD V | MAINTENANCE RECORD M | MILEAGE (km/KWh) | BATTERY CONSUMPTION CHARACTERISTIC |
|---|---|---|---|---|---|---|---|
| ID010001 | ... | ... | ... | ... | ... | ... | B1 |
| ID010002 | ... | ... | ... | ... | ... | ... | B2 |
| ID010003 | ... | ... | ... | ... | ... | ... | B3 |
| ... | | | | | | | ... |

F I G. 7F

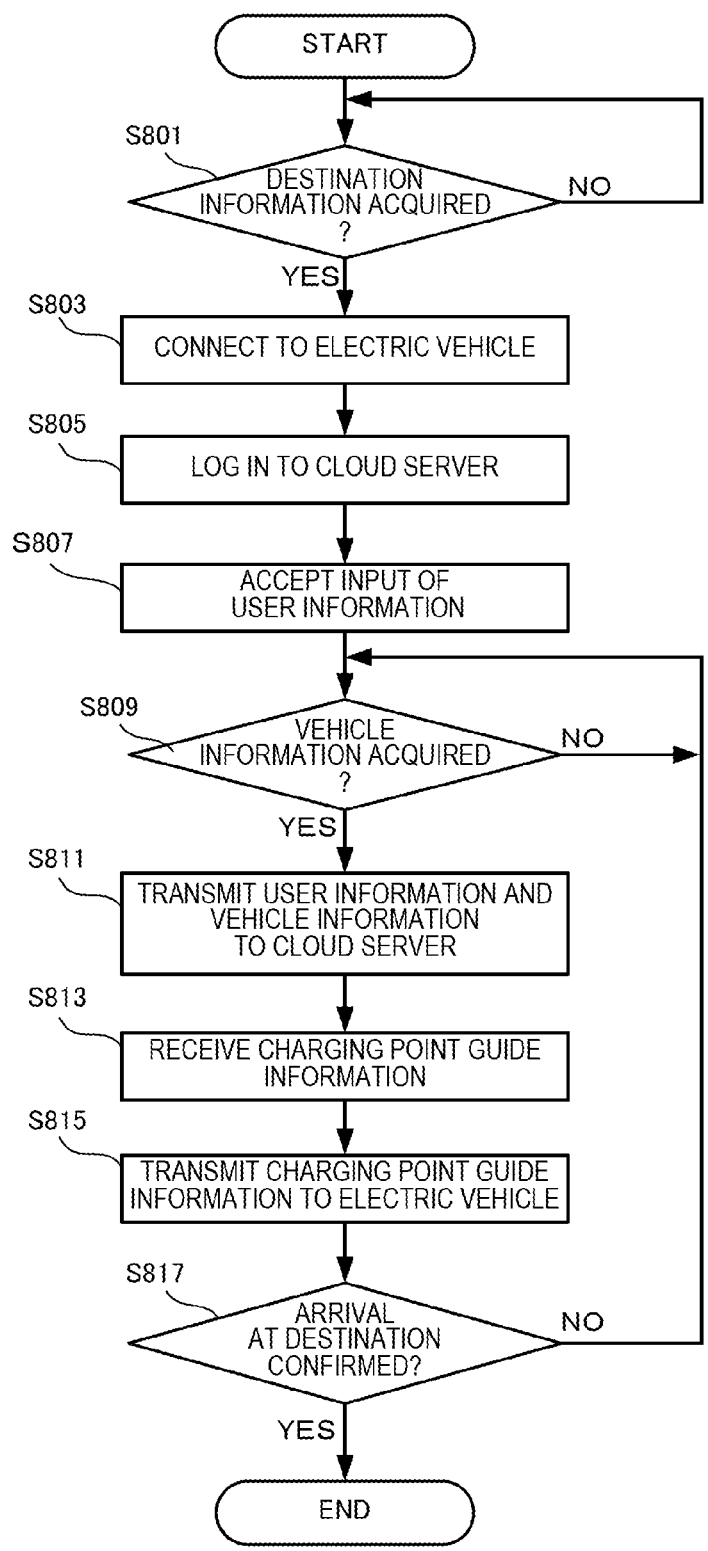
F I G. 8A

| DEVICE DESCRIPTOR | INTERFACE DESCRIPTOR | VENDOR ID | PRODUCT ID |
|---|---|---|---|
| AAAAAA | XXXXXX | ○○○○ | ●●● |
| BBBBBB | YYYYY | △△△△ | ▲▲▲▲ |
| CCCCCC | ZZZZZ | □□□□ | ■■■■ |
| ... | ... | ... | ... |

1080

F I G. 10E

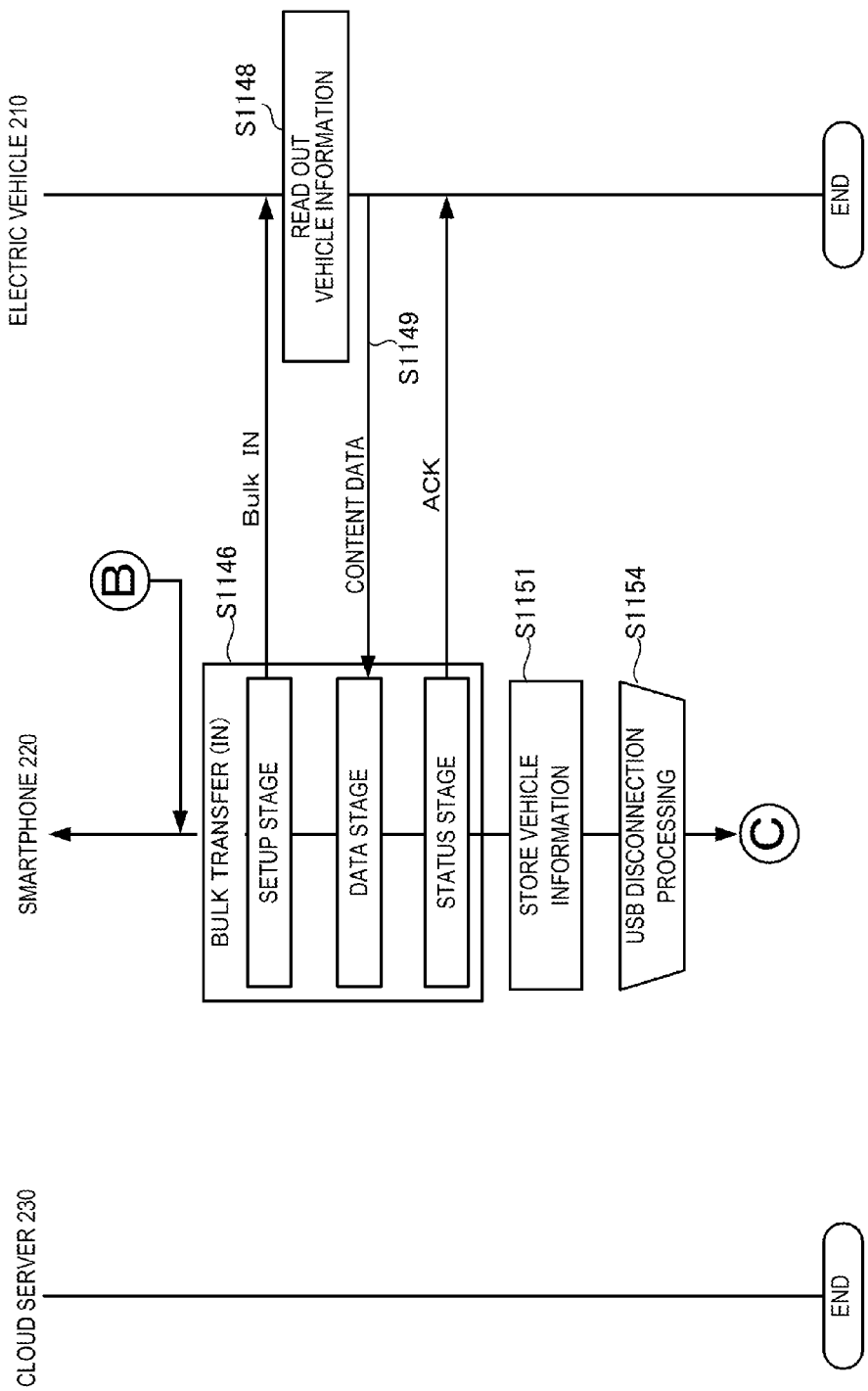

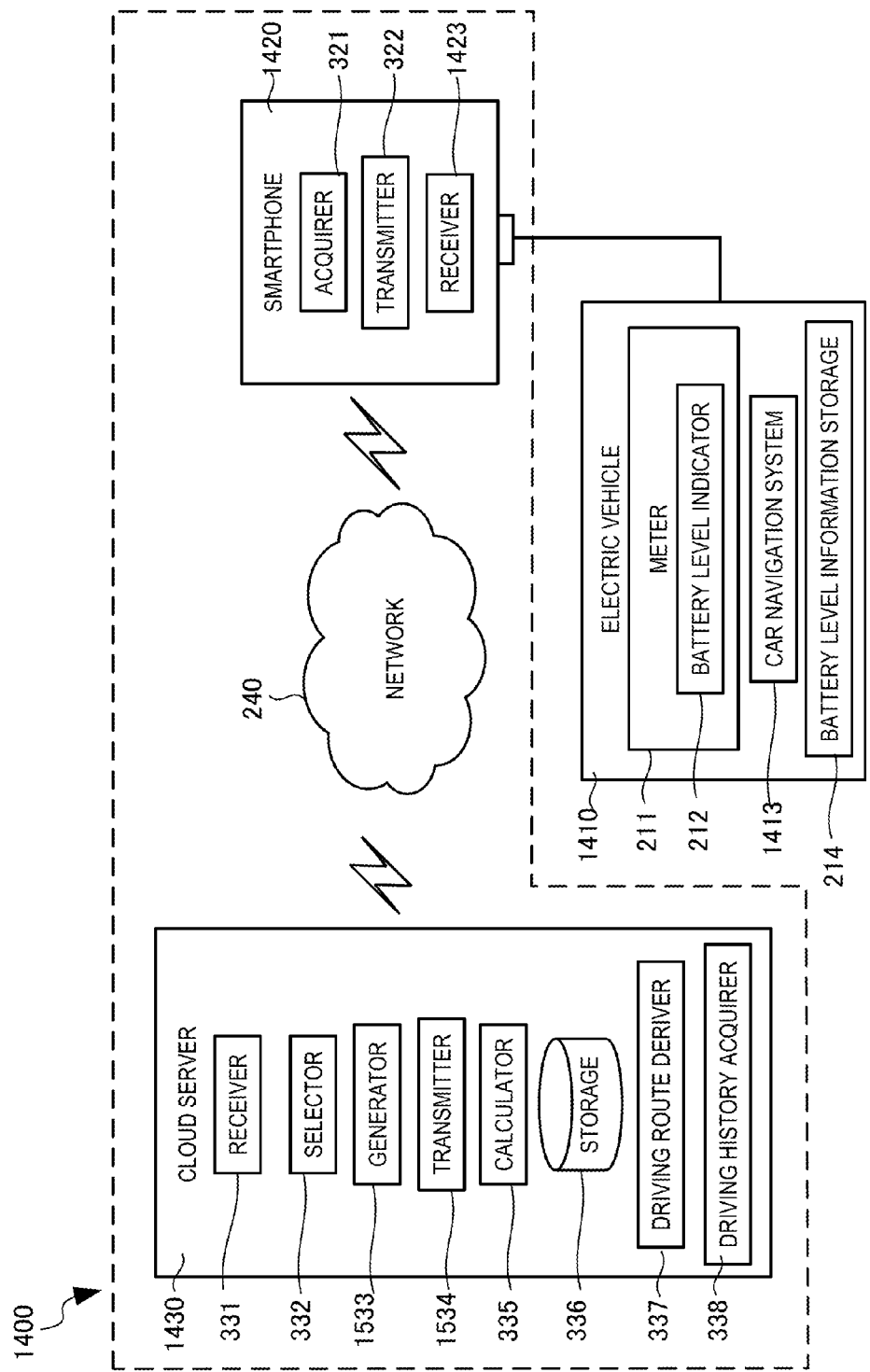
F I G. 15

TECHNIQUES FOR PROVIDING REPLENISHMENT POINT INFORMATION

CROSS-REFERENCE TO RELATED APPLICATIONS

This application is a national stage application of International Application No. PCT/JP2013/064236 entitled "Information Processing System, Information Processing Method, Portage Communication Terminal, Control Method and Control Program of Portable Communication Terminal, Server, and Control Method and Control Program of Server," filed on May 22, 2013, which claims the benefit of the priority of Japanese Patent Application No. 2012-125363, filed on May 31, 2012, the disclosures of each of which are hereby incorporated by reference in their entirety.

TECHNICAL FIELD

The present invention relates to a technique of supporting replenishment of the power source of a vehicle.

BACKGROUND ART

In the above technical field, patent literature 1 discloses a technique of calculating a charging amount or charging time upon charging at the time of traveling with an electric vehicle.

CITATION LIST

Patent Literature

Patent literature 1: Japanese Patent Laid-Open No. 2010-32459

SUMMARY OF THE INVENTION

Technical Problem

In the technique described in the above literature, however, it is impossible to display battery level calculation or charging point notification based on the characteristic of the user or vehicle and provide sufficiently comfortable drive.

The present invention enables to provide a technique of solving the above-described problem.

Solution to Problem

One aspect of the present invention provides a system comprising a portable communication terminal and a server, the portable communication terminal comprising:

a current location/destination information acquirer that acquires current location information and destination information of a vehicle;

a power source level information acquirer that acquires power source level information representing a remaining level of a power source of the vehicle; and a first transmitter that transmits the current location information, the destination information, and the power source level information to a server, and the server comprising:

a first receiver that receives the current location information, the destination information, and the power source level information;

an accumulator that accumulates past driving history information using the vehicle and a plurality of replenishment enable points representing positions where the power source of the vehicle can be replenished;

a selector that selects, based on the current location information, the destination information, and the power source level information, which are received, and the accumulated driving history information, a replenishment point representing a position where the power source of the vehicle should be replenished from the plurality of replenishment enable points; and a second transmitter that transmits information about the selected replenishment point to the portable communication terminal.

Another aspect of the present invention provides a method comprising:

causing a portable communication terminal to acquire current location information and destination information of a vehicle;

causing the portable communication terminal to acquire power source level information representing a remaining level of a power source of the vehicle;

causing the portable communication terminal to transmit the current location information, the destination information, and the power source level information to a server;

causing the server to receive the current location information, the destination information, and the power source level information;

causing the server to accumulate past driving history information using the vehicle and a plurality of replenishment enable points representing positions where the power source of the vehicle can be replenished;

causing the server to select, based on the current location information, the destination information, and the power source level information, which are received, and the accumulated driving history information, a replenishment point representing a position where the power source of the vehicle should be replenished from the plurality of replenishment enable points; and causing the server to transmit information about the selected replenishment point to the portable communication terminal.

Still other aspect of the present invention provides a portable communication terminal capable of communicating with a server and a vehicle, comprising:

a current location/destination information acquirer that acquires current location information and destination information of the vehicle;

a power source level information acquirer that acquires power source level information representing a remaining level of a power source of the vehicle;

a first transmitter that transmits the current location information, the destination information, and the power source level information to the server; and a presenter that presents, to a user, a replenishment point representing a position where the power source of the vehicle should be replenished.

Still other aspect of the present invention provides a control method of a portable communication terminal capable of communicating with a server and a vehicle, the method comprising:

acquiring current location information and destination information of the vehicle;

acquiring power source level information representing a remaining level of a power source of the vehicle;

transmitting the current location information, the destination information, and the power source level information to the server; and presenting, to a user, a replenishment point representing a position where the power source of the vehicle should be replenished.

Still other aspect of the present invention provides a control program of a portable communication terminal capable of communicating with a server and a vehicle, the program causing a computer to execute a method comprising:

acquiring current location information and destination information of the vehicle;

acquiring power source level information representing a remaining level of a power source of the vehicle;

transmitting the current location information, the destination information, and the power source level information to the server; and presenting, to a user, a replenishment point representing a position where the power source of the vehicle should be replenished.

Still other aspect of the present invention provides a server comprising:

a receiver that receives current location information and destination information of a vehicle and power source level information representing a remaining level of a power source of the vehicle from a portable communication terminal connected to the vehicle;

an accumulator that accumulates past driving history information using the vehicle and a plurality of replenishment enable points representing positions where the power source of the vehicle can be replenished;

a selector that selects, based on the current location information, the destination information, and the power source level information, which are received, and the accumulated driving history information, a replenishment point representing a position where the power source of the vehicle should be replenished from the plurality of replenishment enable points; and a transmitter that transmits information about the selected replenishment point to the portable communication terminal.

Still other aspect of the present invention provides a control method of a server, comprising:

receiving current location information and destination information of a vehicle and power source level information representing a remaining level of a power source of the vehicle from a portable communication terminal connected to the vehicle;

selecting, based on past driving history information accumulated in the server in advance, the destination information, and the current location information, a replenishment point representing a position where the power source of the vehicle can be replenished; and transmitting information about the selected replenishment point to the portable communication terminal.

Still other aspect of the present invention provides a control program of a server, the program causing a computer to execute a method comprising:

receiving current location information and destination information of a vehicle and power source level information representing a remaining level of a power source of the vehicle from a portable communication terminal connected to the vehicle;

selecting, based on past driving history information accumulated in the server in advance, the destination information, and the current location information, a replenishment point representing a position where the power source of the vehicle can be replenished; and transmitting information about the selected replenishment point to the portable communication terminal.

Advantageous Effects of Invention

According to the present invention, it is possible to provide a notification of a power source replenishment point based on the driving history information of a vehicle and provide comfortable drive.

BRIEF DESCRIPTION OF DRAWINGS

FIG. 2 is a view showing the outline of an information processing system according to the second embodiment of the present invention;

FIG. 4 is a sequence chart showing overall processing including the information processing system and an electric vehicle according to the second embodiment of the present invention;

FIG. 6A is a table of user information according to the second embodiment of the present invention;

FIG. 6B is a table of a driving history for each model according to the second embodiment of the present invention;

FIG. 7A is a table of driving time information according to the second embodiment of the present invention;

FIG. 7E is a table of vehicle maintenance information according to the second embodiment of the present invention;

FIG. 7F is a table of battery consumption characteristics according to the second embodiment of the present invention;

FIG. 8A is a flowchart showing processing of the smartphone according to the second embodiment of the present invention;

FIG. 10E is a view showing the arrangement of a table used by the information processing system according to the second embodiment of the present invention;

FIG. 11C is a flowchart showing an example of communication establishment processing between the server and the electric vehicle in the information processing system according to the second embodiment of the present invention;

FIG. 15 is a block diagram showing the arrangement of the information processing system according to the fourth embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

[First Embodiment]

An information processing system 100 according to the first embodiment of the present invention will be described with reference to FIG. 1.

Figure 1:
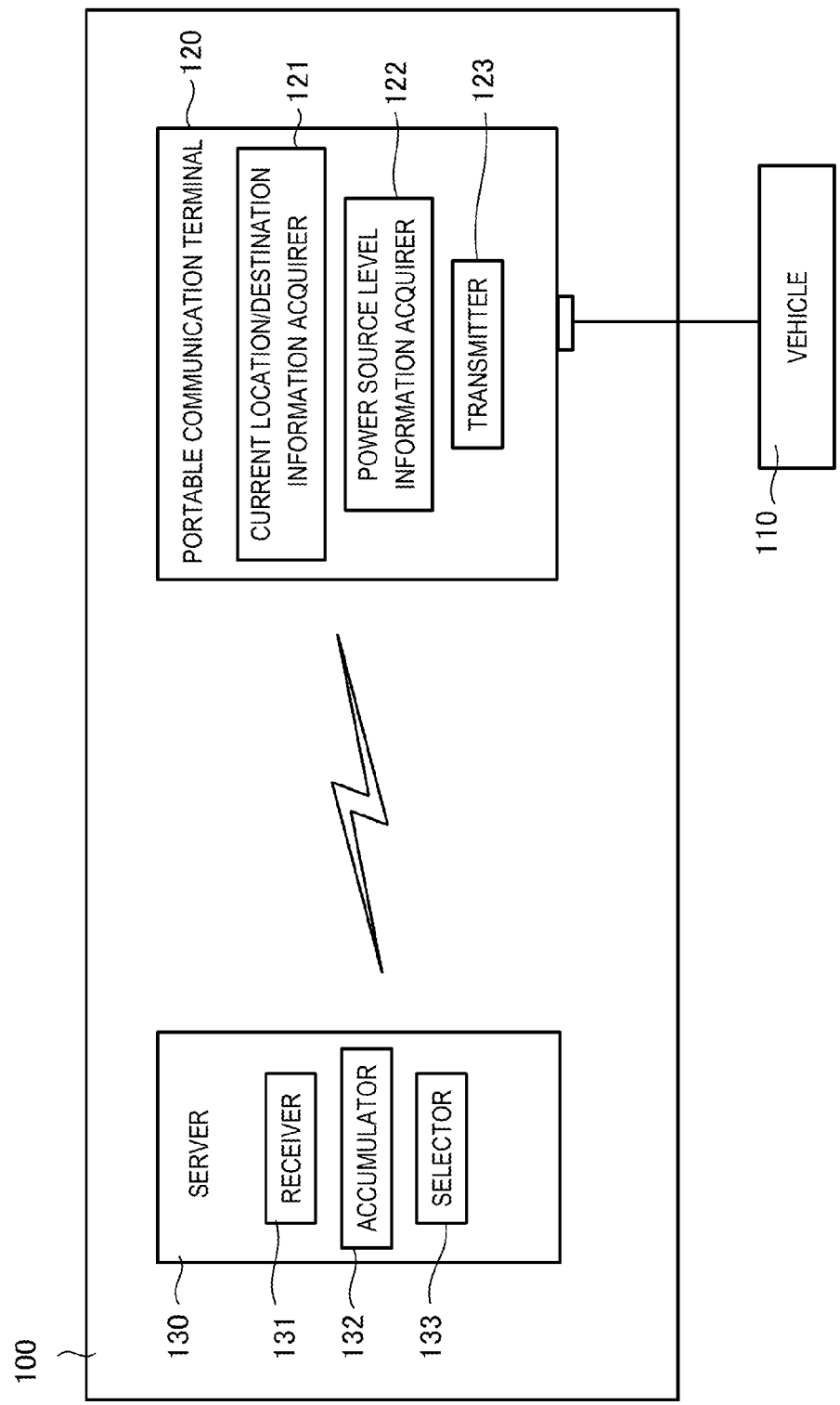
FIG. 1 is a block diagram showing the arrangement of an information processing system according to the first embodiment of the present invention.

As shown in FIG. 1, the information processing system 100 includes a portable communication terminal 120 and a server 130. The portable communication terminal 120 is communicably connected to the server 130 and a vehicle 110.

The portable communication terminal 120 includes a current location/destination information acquirer 121, a power source level information acquirer 122, and a transmitter 123. The server 130 includes a receiver 131, an accumulator 132, and a selector 133.

The current location/destination information acquirer 121 of the portable communication terminal 120 acquires the current location information and destination information of the vehicle. The power source level information acquirer 122 acquires, from the vehicle, power source level information representing the remaining level of the power source. The transmitter 123 transmits the current location information, the destination information, and the power source level information to the server 130. The receiver 131 of the server 130 receives the current location information, the destination information, and the power source level information from the transmitter 123 of the portable communication terminal 120. The accumulator 132 accumulates past driving history information using the vehicle 110 and a plurality of replenishment enable points representing positions where the power source of the vehicle 110 can be replenished. Based on the received current location information, destination information, and power source level information, the selector 133 selects, from the plurality of replenishment enable points, a replenishment point representing a position where the power source of the vehicle 110 should be replenished.

With the above arrangement and operation, according to the information processing system of this embodiment, it is possible to provide a notification of a power source replenishment point based on the driving history information of the vehicle and provide comfortable drive.

[Second Embodiment]

The outline of an information processing system 200 according to the second embodiment of the present invention will be described next with reference to FIG. 2.

An electric vehicle 210 that is an example of a vehicle is scheduled to drive from Tokyo Skytree in Tokyo to Mt. Fuji. When departing, the user connects a smartphone 220 that is an example of a smartphone to the electric vehicle 210. The smartphone 220 acquires destination information concerning the user's destinations (for example, Mt. Fuji and Enoshima in the city of Fujisawa of Kanagawa Prefecture) based on a schedule input by the user in advance to a schedule application. The smartphone 220 also acquires, from the connected electric vehicle 210, battery level information that is an example of power source level information, and also vehicle information such as the ID, current location information, driving speed, driving distance, and driving time of the vehicle in addition to the battery level information. Note that the destination information may be acquired not only from the schedule application but also by a direct input operation to the smartphone 220 by the user. The current location information may be acquired not from the electric vehicle 210 but using a GPS (Global Positioning System) incorporated in the smartphone 220. The smartphone 220 transmits the destination information and the vehicle information to a cloud server 230. In the description of FIG. 2, the destination is acquired from the schedule application stored in the smartphone 220. However, the destination may be selected by the user from destination candidates displayed on the screen of the smartphone 220, and the present invention is not limited to these.

Based on the received destination information, vehicle information, and past driving history information, the cloud server 230 selects, from the neighborhood of the driving route, a charging point that is an example of a replenishment point where the electric vehicle 210 should make a stop, and generates charging point guide information used to display the selected charging point together with the driving route. Here, the driving history information includes the past driving date/time information, driving route information, driving speed information, and driving state information of the vehicle. The cloud server 230 transmits the generated charging point guide information to the smartphone 220. The charging point guide information is, for example, information including driving route information that connects the current location and the destination of the vehicle and the position information of the charging point.

Referring to FIG. 2, at Tokyo Skytree as the departure location, a battery level indicator 212 of a meter 211 indicates that the battery level is 100% (212a). The expected battery utilization at the time of departure is 55% near Enoshima in the city of Fujisawa of Kanagawa Prefecture (212b). After that, the battery is charged to 100% in Ashigara Service Area (SA) 270 of the Tomei Expressway (212c), and the battery level is expected to be 80% at Mt. Fuji (212d).

In actual driving, however, the battery level lowered to 50% because of traffic jams on the Tokyo Metropolitan Expressway and near the city of Yokohama (212e). The cloud server 230 reselects the charging point of the electric vehicle 210 based on traffic information received from VICS® (Vehicle Information and Communication System®), the past driving history in traffic jams, and the like, and presents charging to 80% not in the Ashigara SA but in Enoshima 271 (212f). The battery level is expected to be 30% when arriving at Mt. Fuji (212g).

The meter 211 of the electric vehicle 210 indicates that the battery level has lowered because of the traffic jam. The meter 211 indicates a driving speed of 20.0 km/h, a driving distance of 40.0 km, a driving time of 3 hrs 1 min, a battery level of 50% on the battery level indicator 212, and a remaining distance of 95.0 km. A car navigation system 213 displays the departure location (indicated by S), the current location (indicated by a filled triangle), Enoshima as the first destination (indicated by 1), the charging point, and Mt. Fuji as the final destination (indicated by G).

The cloud server 230 changes the charging point of the electric vehicle 210 based on the traffic information received from VICS® and the past driving history, and generates charging point guide information that displays the charging point on the map. The cloud server 230 transmits the charging point guide information to the smartphone 220 via a network 240. Upon receiving the latest charging point guide information, the smartphone 220 transmits it to the connected electric vehicle 210. Note that the cloud server 230 may receive weather information and the like in addition to the traffic information and use them for charging point selection.

(Arrangement of Information Processing System)

Figure 3A:
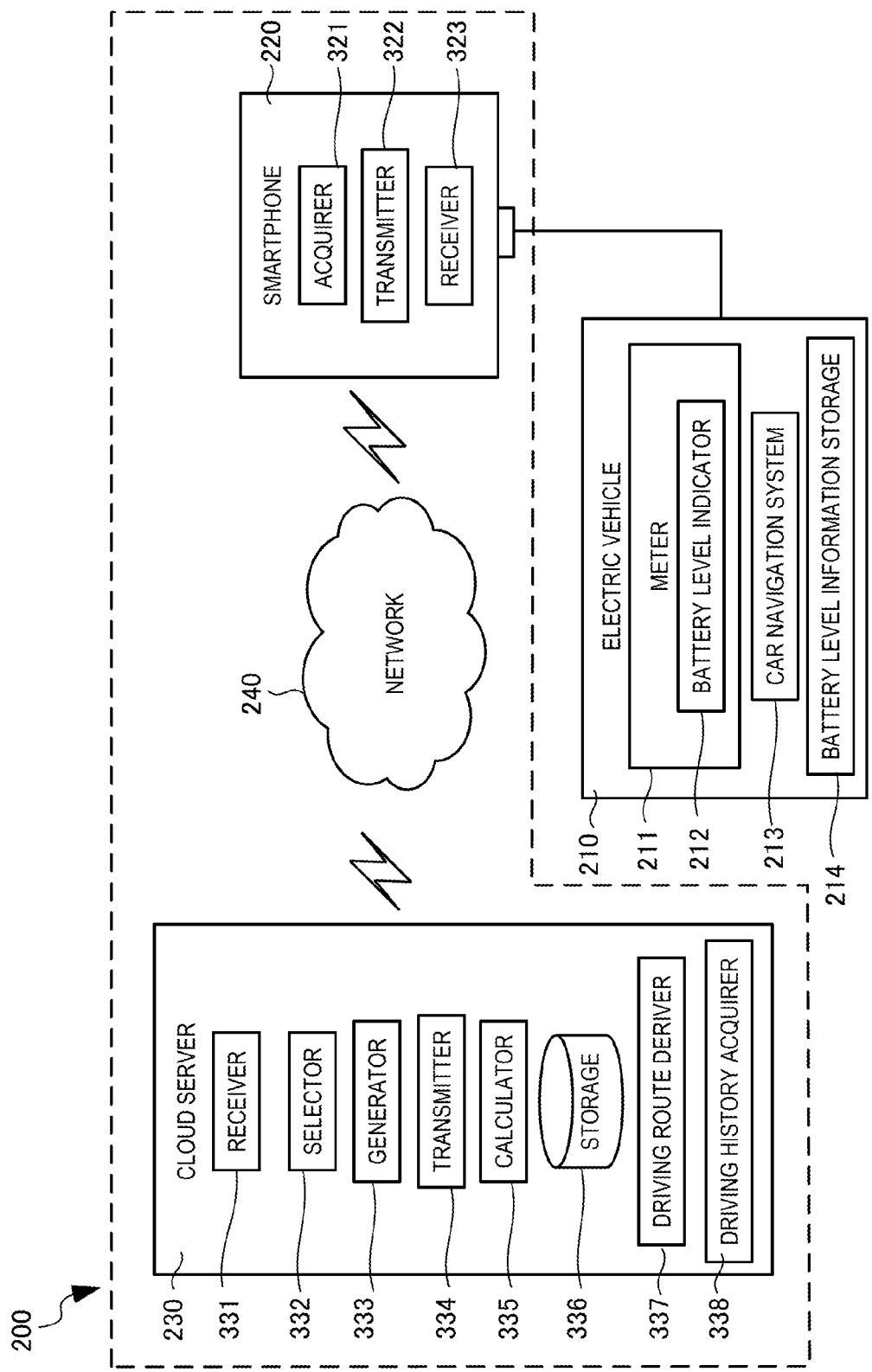
FIG. 3A is a block diagram showing the arrangement of the information processing system according to the second embodiment of the present invention.

A description will be made next with reference to FIG. 3A as a block diagram showing the arrangement of the information processing system 200. The information processing system 200 includes the smartphone 220 and the cloud server 230. The smartphone 220 and the cloud server 230 are communicably connected via the network 240. The smartphone 220 is communicably connected to the electric vehicle 210.

The electric vehicle 210 includes the meter 211, the car navigation system 213, and a battery level information storage 214. The meter 211 further includes the battery level indicator 212. The meter 211 shows the driving speed, the driving distance, and the driving time, and also shows the guideline of the drivable distance ("95.0 km left" indicated by the battery level indicator 212 in FIG. 2). The battery level indicator 212 indicates the battery level as a value of 0% to 100%. However, the battery level indication method is not limited to this. The battery level information storage 214 is connected to a battery (not shown), and detects and stores the level of electric power in the battery as needed.

The smartphone 220 includes an acquirer 321, a transmitter 322, and a receiver 323. The acquirer 321 acquires the destination information of the electric vehicle 210 based on the schedule information of the driver input to the schedule application (not shown). The acquirer 321 may estimate the destination from communication in an SNS (Social Networking Service), chat, or mail or acquire it from an input (telephone number, place name, or position on the map) to the car navigation system or in synchronism with a destination guide derived by the car navigation system.

The acquirer 321 also acquires, from the electric vehicle 210, at least one of the ID (IDentification), current location information, driving speed, driving distance, driving route, and driving time of the electric vehicle 210 as vehicle information in addition to the battery level information. Note that the vehicle information is not limited to these, and any other information about the electric vehicle is usable. The acquirer 321 also acquires charging point guide information about a charging point (or charging stand) on the driving route from the current location to the destination, which is generated by the generator of the cloud server 230. The transmitter 322 transmits the destination information and vehicle information received from the electric vehicle 210 to the cloud server 230, and also transmits charging point guide information received from the cloud server 230 to the electric vehicle 210. The receiver 323 receives charging point guide information generated and transmitted by the cloud server 230.

The cloud server 230 includes a receiver 331, a selector 332, a generator 333, a transmitter 334, a calculator 335, a storage 336, a driving route deriver 337, and a driving history acquirer 338. The receiver 331 receives the battery level information, the destination information, and the current location information of the electric vehicle from the smartphone 220. The battery level information is included in the vehicle information.

The selector 332 predicts a battery consumption based on the driving route information and the driving history information, and selects, based on the battery level information and the battery consumption, a recommended charging point from a plurality of charging enable points registered in advance. The selector 332 selects the charging point in consideration of the current vehicle information as well. The selector 332 selects the charging point based on past driving state information and current driving state information as well. The selector 332 selects the charging point at a timing when the driving distance of the electric vehicle has reached a predetermined distance or at a timing when the driving time of the electric vehicle has reached a predetermined time.

For example, when a traffic jam occurs on the way home from an outing in the afternoon of the last of consecutive holidays, and the air conditioner is used heavily because of a high temperature and humidity, the battery level is determined to lower quickly. After calculating a future drivable distance corresponding to the predicted battery consumption, the battery charging point is selected. A plurality of battery charging points are preferably selected, although the number may be one. The predetermined timing can be set by the user based on, for example, a predetermined driving time like "once every 30 min" or a predetermined driving distance like "once every 10 km". Note that the position information of the charging point is updated as needed and stored in the storage 336.

Figure 3B:
FIG. 3B is a table of the information of charging enable points according to the second embodiment of the present invention.

If referring to the driving history of the driver shown in FIG. 6A reveals that the driver often makes a stop at a convenience store, a charging point provided at a convenience store is preferentially proposed. Alternatively, by referring to the driving schedule or time of the driver based on the area, attribute, and electricity rate (yen/KWh) of each charging point using a table 350 representing information of charging enable points shown in FIG. 3B, or in accordance with a direct wish of the driver, the selector 332 determines that charging is preferably done during a meal, and preferentially proposes a charging point provided at a restaurant.

When selecting a charging point, the selector 332 may propose electric energy to charge at each charging point together. For example, considering the driving schedule of the next day, the selector 332 may propose electric energy that enables driving without charging on the next day.

On the other hand, the selector 332 presents the electricity rate at each charging point to the user, and also selects a charging point of high electricity rate near the electric vehicle 210 and another charging point of low electricity rate. When the driver inputs a desired parameter (for example, a point of low electricity rate) to the portable communication terminal by voice, the cloud server 230 may analyze the voice, and the selector 332 may select a recommended charging point that accomplishes the driver's wish.

The generator 333 generates replenishment point guide information including the charging point selected by the selector 332 and driving route information up to the destination. One or a plurality of charging points can be included in the charging point guide information. The user may be able to select the number of recommended charging points. At a charging point of high electricity rate near the electric vehicle 210, the generator 333 may propose information representing a minimum necessary replenishment amount as a stopgap until the other charging point of low electricity rate. The generator 333 presents route information up to the charging point of low electricity rate via the charging point of high electricity rate. On the other hand, at a charging point of low electricity rate, the generator 333 may propose full charging at the charging point of low electricity rate based on the current battery level and the electricity rates of other charging points that exist on the route to the destination.

The transmitter 334 transmits the charging point guide information generated by the generator 333 to the smartphone 220 via the network 240.

The calculator 335 calculates a battery consumption or a battery consumption characteristic based on driving date/time information, driving environment information, traffic information, vehicle information, and vehicle maintenance information.

The storage 336 stores map information and position information of charging points, and also functions as an accumulator that accumulates past driving history information using the electric vehicle 210. The storage 336 also accumulates past driving state information of an electric vehicle of the same model as the electric vehicle 210 or an electric vehicle having the same performance in terms of driving capability as the electric vehicle 210 in addition to the past driving state information of the electric vehicle 210. Based on the past driving state information and current driving state information about the electric vehicle 210 of the same model as the electric vehicle 210 or the vehicle having the same performance in terms of driving capability as the electric vehicle 210, the selector 332 selects a charging point from a plurality of charging points registered in advance. The storage 336 may acquire, from an SNS (Social Networking Service), information about the road state such as "many students", "many reckless drivers", or "many elderly persons wandering due to dementia" and store the information. The selector 332 may select a charging point using the information.

Groups to share the information stored in the storage 336 may hierarchically be registered in advance, and each group may share information within a range predetermined for each layer. For example, layering may be done such that a family shares whole information, friends share not schedules but models and driving histories, and the circle or acquaintance of a microblog such as Twitter® shares only charging point use histories. Driving methods for suppressing a power consumption may be accumulated in the storage 336 among friends to share the knowledge. The cloud server 230 may derive an optimum driving method from the accumulated knowledge and advise the driver via the smartphone 220.

The storage 336 also stores an application program in addition to the driving history information (not shown). The application program is activated when the user logs in from the smartphone 220 connected to the electric vehicle 210 to the cloud server 230 and displays various GUIs (Graphic User Interfaces) on the display of the smartphone 220. The application program behaves as if it were installed in the smartphone 220, detects a user operation on the smartphone 220, performs processing corresponding to the operation, and changes the screen display of the smartphone 220. The application program thus receives user inputs, acquires information about the user or the electric vehicle 210, and forms databases in the storage 336.

The driving route deriver 337 derives driving route information up to the destination based on destination information and current location information. After the selector 332 selects a charging point, the driving route deriver 337 derives a driving route including the charging point again. At this time, information concerning the features of the driving route may be included in the driving route information. For example, if the route up to a charging point A has features such as "narrow", "many one-way streets", "traffic jams readily occur", and "including school zones", the driving route deriver 337 transmits the features to the smartphone 220 via the transmitter 334 so as to notify the user of them.

The driving history acquirer 338 acquires the past driving date/time information, driving route information, driving speed information, and driving state information of the vehicle as driving history information and stores them in the storage 336. The driving state information includes at least one of driving environment information about the driving environment of the vehicle, traffic information about a traffic jam/traffic restriction, and vehicle maintenance information about the maintenance of the vehicle. The driving environment information is information about the temperature, humidity, wind direction, wind velocity, precipitation, weather, and the like of the driving route. A driving date/time may be added with an attribute such as Bon Festival or New Year and stored in the storage 336. Traffic jams may be divisionally stored as accidental traffic jams and construction traffic jams.

(Procedure of Processing of Entire Information Processing System)

The procedure of overall processing including the information processing system 200 and the electric vehicle 210 will be described next with reference to FIG. 4. FIG. 4 is a sequence chart the procedure of processing of the information processing system 200 and the electric vehicle 210.

In step S401, the acquirer 321 of the smartphone 220 acquires the destination information of the electric vehicle 210 from the schedule application. In step S403, the smartphone 220 is connected to the electric vehicle 210. In step S405, the smartphone 220 logs in to the cloud server 230. In step S407, the cloud server 230 performs login processing and activates the application program. In step S409, the meter 211 of the electric vehicle 210 displays a vehicle ID 451, a driving distance 352, and a driving time 453 as vehicle information 450, and also displays a battery level 454 on the battery level indicator 212. In step S411, the smartphone 220 accepts input of user information by the user. In step S413, the electric vehicle 210 transmits the vehicle information 450 such as the vehicle ID 451 to the smartphone 220.

In step S415, when the receiver 323 of the smartphone 220 receives the vehicle information 450, the transmitter 322 transmits the destination information, the vehicle information 450, and the user information to the cloud server 230. In step S417, the selector 332 of the cloud server 230 reads out the data of a plurality of charging points stored in the storage 336 and selects a charging point. In step S419, the generator 333 generates charging point guide information that displays the selected charging point on the driving route. In step S421, the transmitter 334 transmits the generated charging point guide information to the smartphone 220. In step S423, the transmitter 322 of the smartphone 220 transmits the received charging point guide information to the electric vehicle 210.

Upon receiving the charging point guide information from the smartphone 220, the electric vehicle 210 displays the charging point guide information (that is, information representing the route from the vehicle position to the destination and the position of the recommended charging point) on the car navigation system 213 in step S425.

(Screen Display of Smartphone)

Figure 5A:
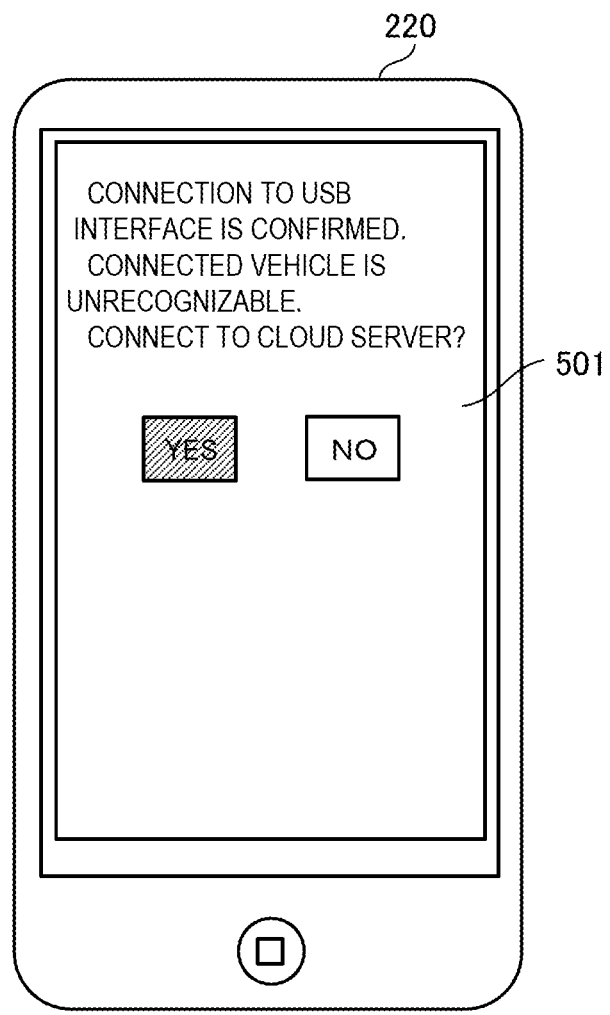
FIG. 5A is a view showing an example of a display screen displayed on a smartphone according to the second embodiment of the present invention.

Display information displayed on a screen 501 of the smartphone 220 will be described next. When connected to the electric vehicle 210, the smartphone 220 determines first whether it has a driver program specialized to the electric vehicle 210. Upon determining that the local device has a driver program, the smartphone 220 receives vehicle information and the like from the electric vehicle 210 using the driver program. There are a variety of models of electric vehicles 210. Hence, storing the driver program of each electric vehicle in the smartphone 220 strains its storage capacity. Normally, instead of storing the driver program in the smartphone 220, the screen 501 shown in FIG. 5A is displayed on the smartphone 220 to cause the user to do confirmation. When the user requests connection to the cloud server 230 (selects YES in FIG. 5A), the smartphone 220 requests the cloud server 230 to establish communication and acquire vehicle information and the like.

After establishing communication with the electric vehicle 210 via the smartphone 220, the cloud server 230 receives vehicle information (battery level, current location, average speed, and the like) from the electric vehicle 210. The cloud server 230 stores the received vehicle information in a user database stored in the storage 336.

Figure 5B:
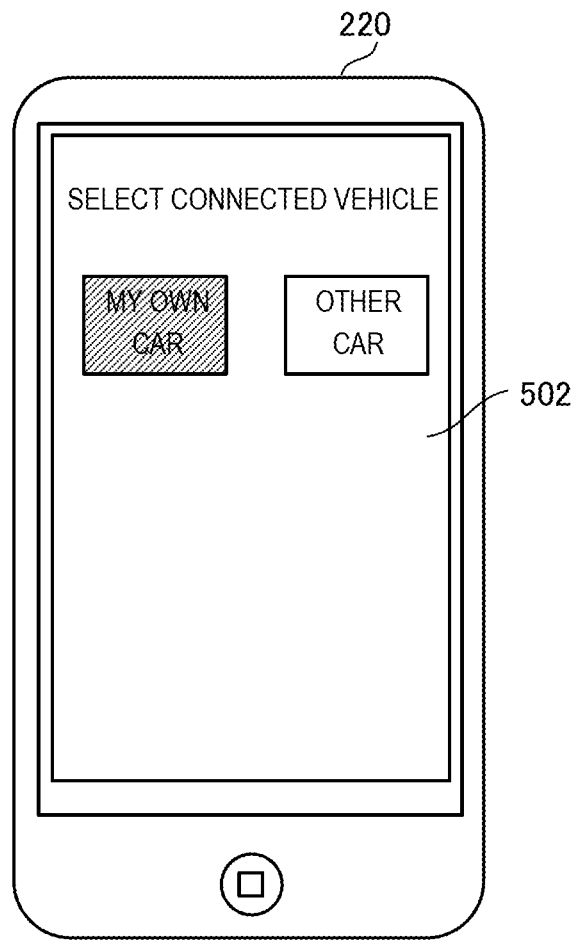
FIG. 5B is a view showing an example of a display screen displayed on the smartphone according to the second embodiment of the present invention.

Simultaneously, the cloud server 230 activates the application program corresponding to the electric vehicle 210 and displays various GUIs such as a screen 502 shown in FIG. 5B on the display of the smartphone 220. FIG. 5B shows the screen 502 in which, for example, "my own car" is selected by the operation of the driver. The application program detects a user operation on the smartphone 220, performs processing corresponding to the operation, and changes the screen display of the smartphone 220. This can prevent the storage capacity of the smartphone 220 from being strained and also obviate the necessity of upgrading the application on the user side.

Figure 5C:
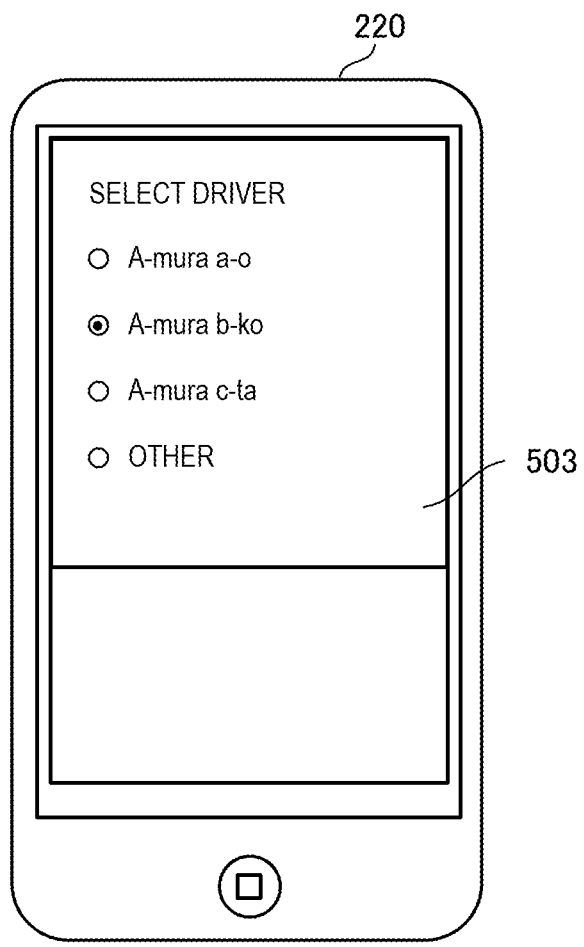
FIG. 5C is a view showing an example of a display screen displayed on the smartphone according to the second embodiment of the present invention.
Figure 5D:
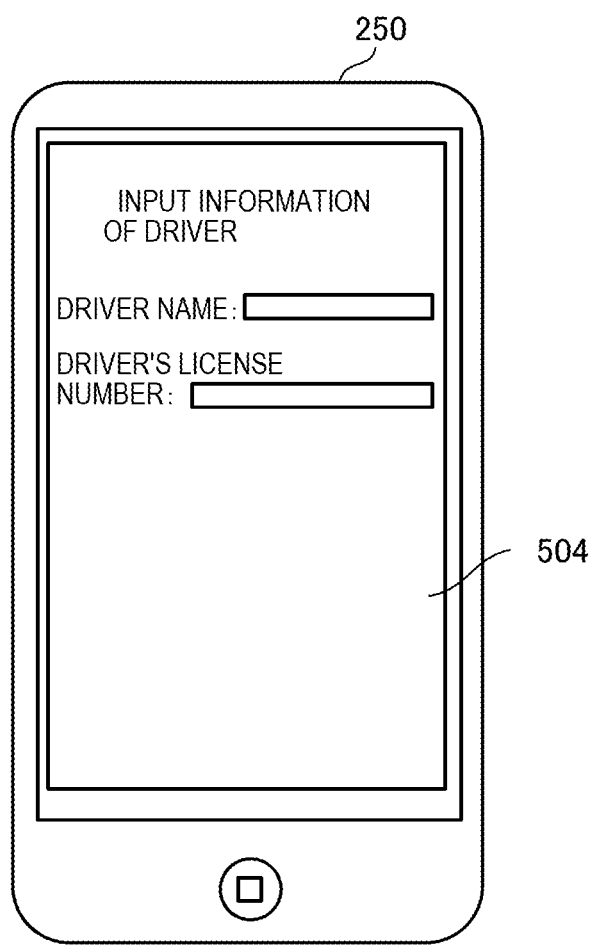
FIG. 5D is a view showing an example of a display screen displayed on the smartphone according to the second embodiment of the present invention.

The application program confirms the ID of the smartphone 220 and the connected electric vehicle 210. When the confirmation ends, the cloud server 230 displays a screen 503 shown in FIG. 5C on the display to cause the user to select a driver. FIG. 5C shows an example in which choices "A-mura a-o", "A-mura b-ko", "A-mura c-ta", and "other driver" are displayed, and "A-mura b-ko" is selected. The cloud server 230 determines whether the selected driver uses the electric vehicle 210 for the first time. Upon determining that the driver uses the electric vehicle for the first time, the cloud server 230 displays a screen 504 shown in FIG. 5D to cause the driver to input information via the GUI. The cloud server 230 accumulates the input information in the database of the storage 336 as user information. The input information includes the driver name and the driver's license number in FIG. 5D. However, the information is not limited to these.

Figure 5E:
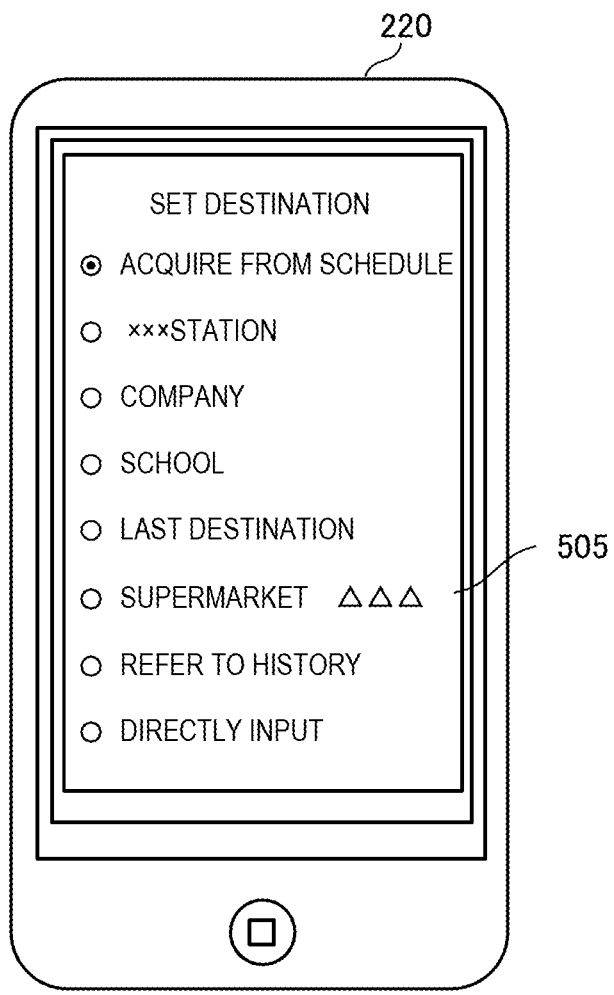
FIG. 5E is a view showing an example of a display screen displayed on the smartphone according to the second embodiment of the present invention.

When the user information registration ends, the application program may request the driver to set the destination. The cloud server 230 displays a screen 505 shown in FIG. 5E and presents "acquire from schedule", "xxx station", "company", "school", and the like as destinations. On the screen 505, the driver selects acquiring the destination from the schedule. Note that the destination may be selected from past driving history information of the driver or set by direct input. If the smartphone 220 acquires destination information from the schedule application in advance, the destination information is transmitted to the cloud server 230 together with the vehicle information and the like. Hence, the driver selects "acquire from schedule".

(Knowledge Table)

User data stored in the database of the storage 336 of the cloud server 230 will be described next with reference to FIGS. 6A and 6B.

FIG. 6A shows a past driving history table 610 concerning a user who has a user ID 50A25PM0 and uses a model KATO Pulsar EV manufactured in 20xx and the user's wife who has a user ID 31B66QM0. Here, the driving history information is information representing when and where the user drove in what kind of driving state at what kind of speed, and includes driving state information. The driving state information includes at least one of driving environment information about the driving environment of the vehicle, traffic information about a traffic jam/traffic restriction, and vehicle maintenance information about the maintenance of the vehicle. The driving environment includes a weather, temperature, humidity, wind direction, wind velocity, precipitation, and the like.

The driving history table 610 includes a timing, area, driving route, attribute, average speed (km/h), and power consumption (KWh) as an example of driving history information. A date on which the Pulsar EV was used is shown as a timing. However, the timing may include a time. It is possible to grasp, by the timings, the tendency of power consumption when the user or the user's family drives. Areas are roughly classified into town, urban district, suburb, traffic jam, tourist area, mountain, and the like based on driving routes.

Attributes are classified, from the driving routes of each user, based on facilities and places such as a convenience store, family restaurant, and supermarket at which the user often makes a stop or the types of facilities near the facilities and places at which a stop is often made. The use tendency of the electric vehicle 210 by the user and the user's family can thus be known.

A driving route is information about a route that the user or the like actually drove. For example, the table shows that the user having the user ID 50A25PM0 used the electric vehicle to go on a shopping in ○○ supermarket on Apr. 29, 2012. Similarly, the user 50A25PM0 drove from xx hotel in ○○ hot springs to □□ art museum on May 5, 2012, as can be seen. When the driving route histories are accumulated in this way, the power consumption of the battery when driving the same route can be grasped.

An average speed (km/h) represents the average value of speeds when driving a driving route. A power consumption (KWh) is the consumption of the battery when driving a driving route. The power consumption is used to predict a power consumption in association with the driving route or average speed.

A case where the driving history information of the user himself/herself or his/her family is accumulated has been described with reference to FIG. 6A. The storage 336 may generate a driving history table 620 on a model basis, as shown in FIG. 6B, so that the driving history information (for example, data of driving environment and battery use state) can be shared in a specific group. The driving history table 620 includes a model, area, timing, average mileage (km/KWh), and variation. There exist a plurality of models A, B, . . . . The models may be specific models on a maker basis, vehicle types such as a sedan, coupe, van, and minivan classified by outer appearance or displacement, or vehicle types classified by driving capability. In the driving history table 620, areas are classified into three types, that is, town, expressway, and suburb. The areas may further be classified into a mountain, coastal area, factory area, industrial area, and residential street.

A timing represents a driving time zone. In the driving history table 620, timings are classified into three types, that is, daytime on weekday, daytime on holiday, and nighttime. However, the timings are not limited to these. An average mileage represents the average value of mileages when the model A drives the same area at the same timing. A variation represents a variation in the average mileage.

Each user can share the user's driving data shown in the driving history table 620 with a preset group. For example, each user can designate a group to share and the range of information to be disclosed such that a group a shares the data of the model A and also shares areas and average mileages of a model B. When such other people's driving history information is used, the power consumption can be estimated more accurately from the information of previous drive by a vehicle of the same model even when the user drives the road for the same time.

Data of each vehicle stored in the database of the storage 336 of the cloud server 230 will be described next with reference to FIGS. 7A to 7F. The calculator 335 calculates a battery consumption or a battery consumption characteristic based on information shown in FIGS. 7A to 7F. The selector 332 selects a charging point based on the calculated battery consumption.

FIG. 7A shows a table 710 representing driving date/time information of each drive of the electric vehicle 210. Driving dates and driving time zones are recorded in the table 710 as driving records D1 to Dn in correspondence with each ID of the electric vehicle 210. Mileages (km/KWh) and variations are also recorded. For example, the table 710 shows a driving date Jan. 2, 2011 and a driving time zone from 8:54 a.m. to 11:20 a.m. as the driving record D1 of an electric vehicle having an ID 101101A. The table 710 shows that the speed of the electric vehicle 210 at that time was 5.5 (km/KWh), and the variation was 15. For the ID 101101A, the driving records D1 to D3 are shown. Similarly, for the ID 101101B, the driving records D1 to D6 are stored.

Figure 7B:
FIG. 7B is a table of driving time information according to the second embodiment of the present invention.

FIG. 7B shows a table 720 representing driving environment information of each drive of the electric vehicle 210. Mileages (km/KWh) are recorded in the table 720 together with environment records E1 to En such as a weather, temperature, humidity, wind direction, wind velocity, and precipitation in correspondence with each ID of the electric vehicle 210. For example, the table 720 shows a weather, temperature, and the like as the environment record El of the electric vehicle having the ID 101101B. The calculator 335 calculates a battery consumption characteristic based on the environment record En and the mileage (km/KWh) of each electric vehicle.

Figure 7C:
FIG. 7C is a table of traffic information according to the second embodiment of the present invention.

FIG. 7C shows a table 730 representing traffic information of each drive of the electric vehicle 210. Pieces of traffic jam information 1 to n, traffic restrictions 1 to n, traffic records T1 to Tn, mileages (km/KWh), and variations are recorded in the table 730 in correspondence with each ID of the electric vehicle 210. For example, the table 730 shows traffic jam information 1, traffic restrictions 1 to n, a mileage (km/KWh), and a variation as the traffic record T1 of the electric vehicle having the ID 101101A. The receiver 331 receives the traffic record Tn for each electric vehicle from the smartphone 220. When the traffic record Tn is stored in the storage 336, the selector 332 grasps the congestion state of the road and selects a charging point based on the driving record D or the environment record E.

Figure 7D:
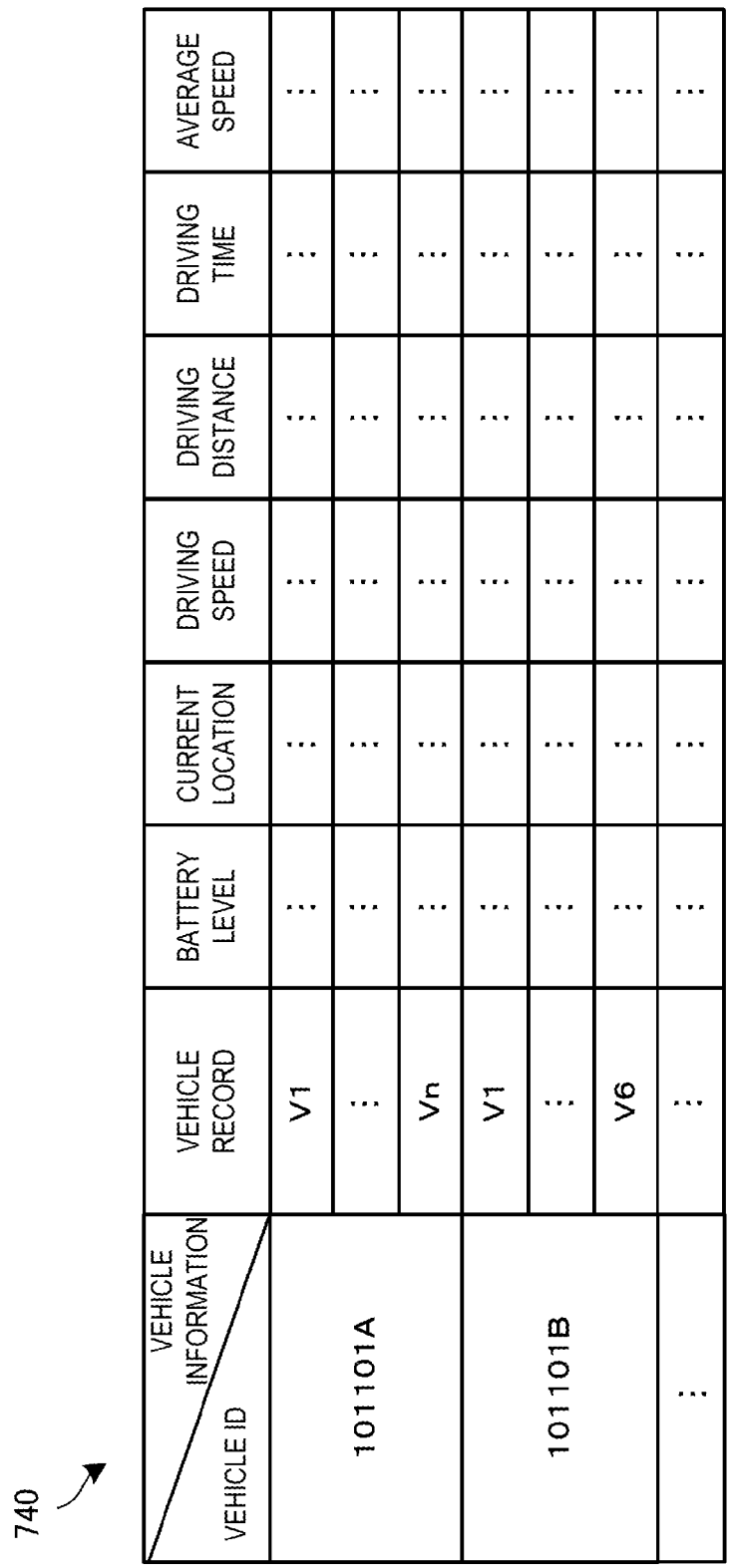
FIG. 7D is a table of vehicle information according to the second embodiment of the present invention.

FIG. 7D shows a table 740 representing vehicle information of each drive of the electric vehicle 210. A battery level, departure location, current location, destination, average speed, driving distance, driving time, driving route, charging information, and the like are recorded in the table 740 as vehicle records V1 to Vn in correspondence with each ID of the electric vehicle 210. For example, the table 740 shows a battery level and the like as the vehicle record V1 of the electric vehicle having the ID 101101A. The selector 332 selects a charging point based on the vehicle record Vn of each electric vehicle.

FIG. 7E shows a table 750 representing vehicle maintenance information of each drive of the electric vehicle 210. A tire pressure, tire wear level, tire exchange time, oil amount, oil contamination, oil exchange time, mileage, and variation are recorded in the table 750 as maintenance records M1 to Mn in correspondence with each ID of the electric vehicle 210. For example, the table 750 shows the traffic records M1 to Mn of the electric vehicle having the ID 101101A. The receiver 331 receives the maintenance record Mn of each electric vehicle from the smartphone 220. When the maintenance record is stored in the storage 336, the calculator 335 uses it to calculate a battery consumption characteristic.

FIG. 7F shows a table 760 representing battery consumption characteristics B1 to Bn each calculated based on the driving record, environment record, traffic record, vehicle record, and maintenance record acquired for each drive of the electric vehicle 210. A battery consumption characteristic is updated and recorded in the table 760 in correspondence with each ID of the electric vehicle 210. For example, the table 760 shows the battery consumption characteristic calculated based on the driving record D, environment record E, traffic record T, vehicle record V, maintenance record M, and mileage (km/KWh) in correspondence with each ID of the electric vehicle 210. The calculator 335 calculates the battery consumption characteristic of the battery of the electric vehicle based on each record of the electric vehicle.

(Processing of Smartphone)

Processing of the smartphone 220 will be described next with reference to FIG. 8A. FIG. 8A is a flowchart showing the procedure of processing of the smartphone 220.

When the acquirer 321 acquires destination information from the schedule application in step S801, the process advances to step S803. If no destination information is acquired, step S801 is repeated. In step S803, the smartphone 220 is connected to the electric vehicle 210. In step S805, the smartphone 220 logs in to the cloud server 230 via the network 240. In step S807, the acquirer 321 accepts input of user information by the user. When the acquirer 321 acquires the vehicle information 450 in step S809, the process advances to step S811. If the vehicle information 450 is not acquired, step S809 is repeated. In step S811, the transmitter 322 transmits the user information and the vehicle information 450 to the cloud server 230 via the network 240. In step S813, the receiver 323 receives charging point guide information from the cloud server 230. In step S815, the transmitter 322 transmits the charging point guide information to the electric vehicle 210. Upon confirming in step S817 that the vehicle has arrived at the destination, the processing ends. If it is not confirmed that the vehicle has arrived at the destination, the process returns to step S809 to acquire the current location and repeat charging point guide information update processing.

(Processing of Cloud Server)

Figure 8B:
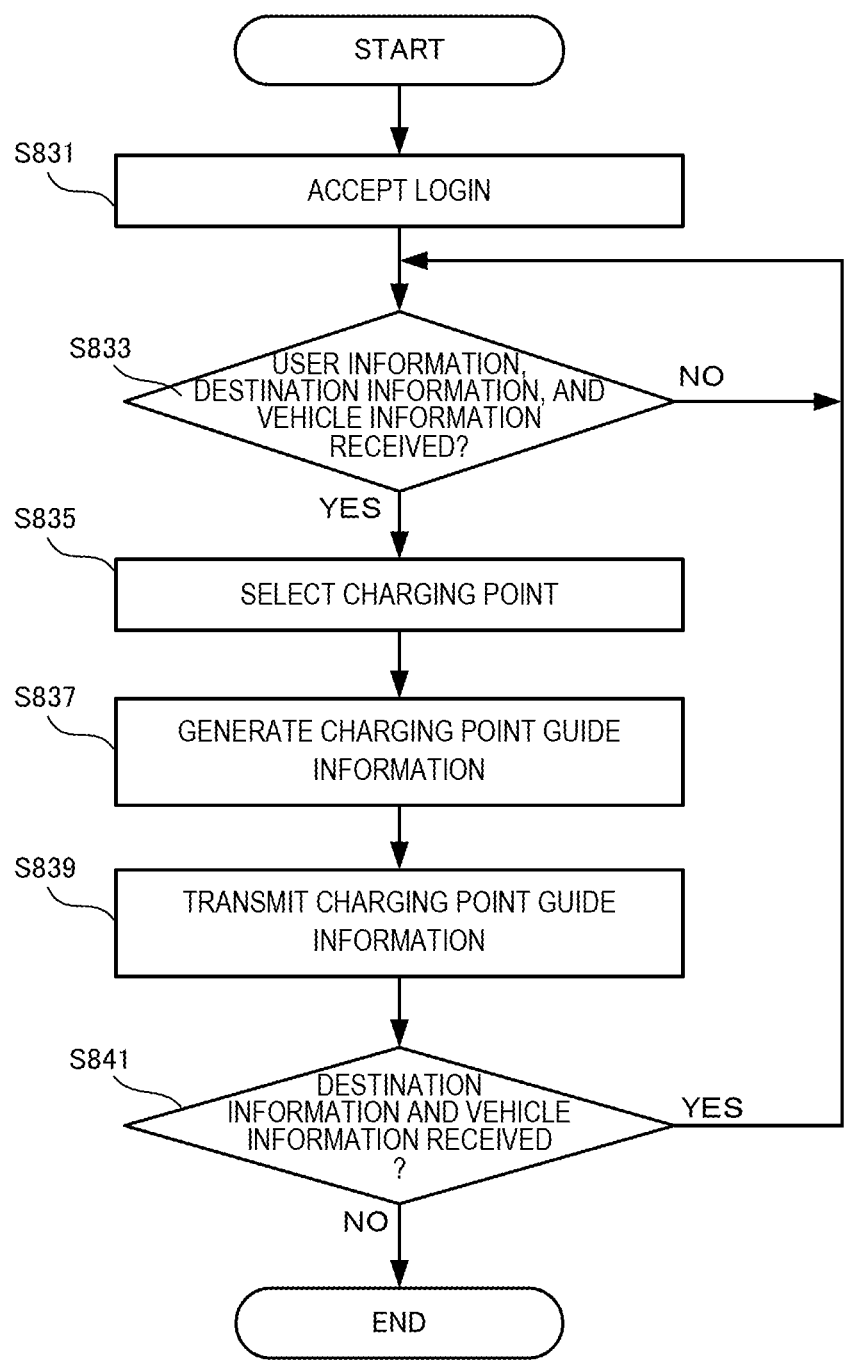
FIG. 8B is a flowchart showing processing of a cloud server according to the second embodiment of the present invention.

Processing of the cloud server 230 will be described next with reference to FIG. 8B. FIG. 8B is a flowchart showing the procedure of processing of the cloud server 230.

In step S831, the cloud server 230 accepts login from the smartphone 220. When the receiver 331 receives user information, destination information, and vehicle information from the smartphone 220 in step S833, the process advances to step S835. When the user information, destination information, and vehicle information are not received, the process is repeated until these pieces of information are received. In step S835, the selector 332 selects a charging point based on the received user information, destination information, and vehicle information and the battery consumption characteristic read out from the storage 336.

In step S837, the generator 333 generates charging point guide information based on the selected charging point. In step S839, the transmitter 334 transmits the charging point guide information to the smartphone 220. If destination information and vehicle information are newly received in step S841, the process returns to step S833. If these pieces of information are not newly received, the processing ends.

(Hardware Arrangement of Cloud Server)

Figure 9:
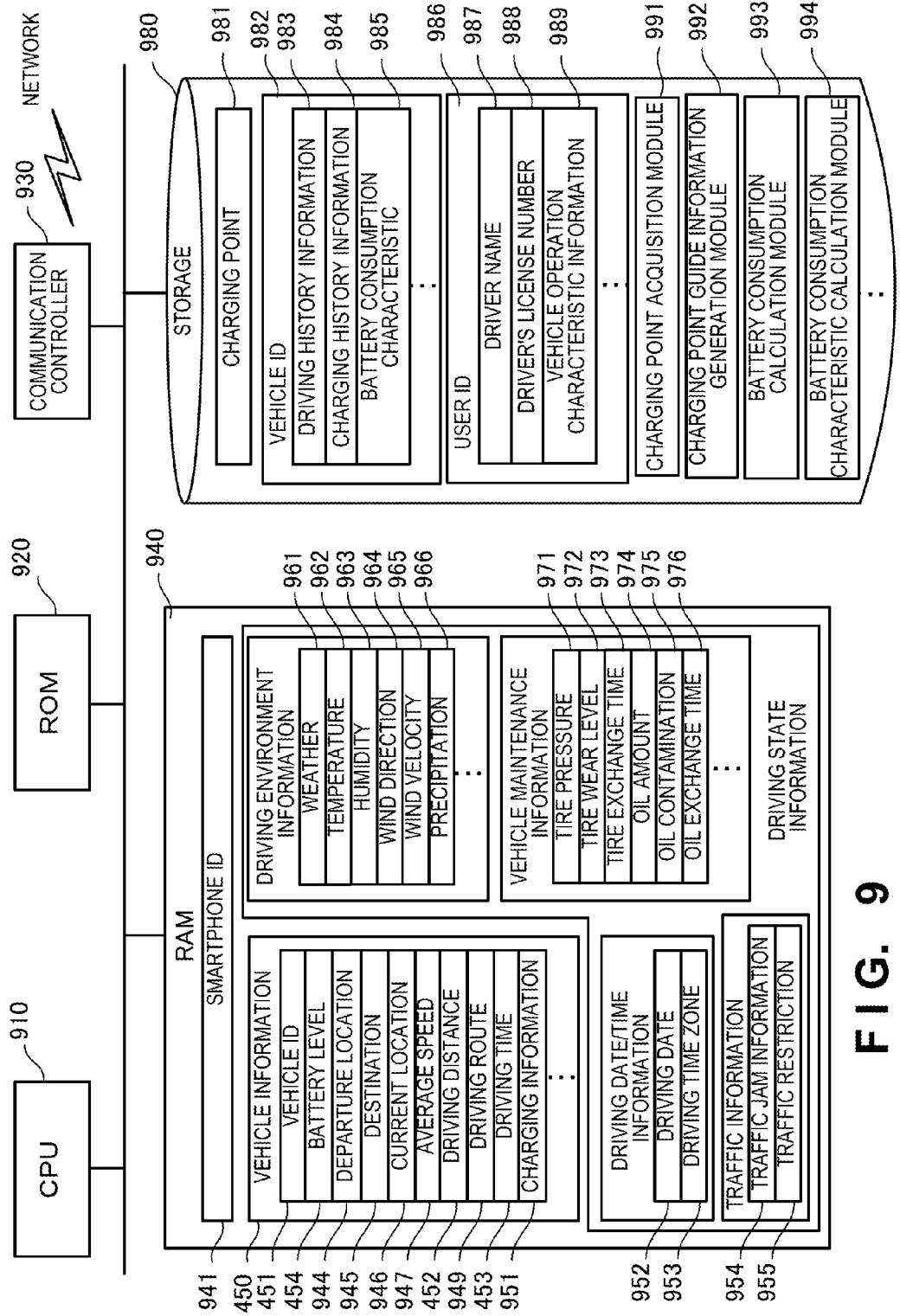
FIG. 9 is a block diagram showing the hardware arrangement of the cloud server according to the second embodiment of the present invention.

The hardware arrangement of the cloud server 230 will be described next. FIG. 9 is a block diagram showing the hardware arrangement of the cloud server 230.

The cloud server 230 includes a CPU (Central Processing Unit) 910, a ROM (Read Only Memory) 920, a communication controller 930, a RAM (Random Access Memory) 940, and a storage 980. The CPU 910 is a central processor, and executes various programs, thereby controlling the entire cloud server 230.

The ROM 920 is a read only memory and stores various kinds of parameters and the like as well as a boot program to be executed by the CPU 910 first. The communication controller 930 controls communication with the smartphone 220 via the network. The RAM 940 is a random access memory and stores an ID 941 of the smartphone 220. The RAM 940 also stores the vehicle information 450, driving date/time information, traffic information, driving environment information, vehicle maintenance information, and the like. The storage 980 stores a charging point 981, the vehicle ID 451, driving history information 983, charging history information 984, a battery consumption characteristic 985, and the like. The storage 980 also stores a charging point acquisition module 991, a charging point guide information generation module 992, a battery consumption calculation module 993, a battery consumption characteristic calculation module 994, and the like.

The ID 941 of the smartphone is the ID of the smartphone 220 that has logged in (S405 in FIG. 4). The RAM 940 stores, as the vehicle information 450, the vehicle ID 451, the battery level 454, a departure location 944, a destination 945, a current location 946, an average speed 947, a driving distance 452, a driving route 949, the driving time 453, and charging information 951.

The vehicle ID 451 is the ID of the vehicle connected to the smartphone 220. The vehicle information 450 stores the current battery level 454, the departure location 944, the destination 945, the current location 946, and the average speed 947 from the departure location 944 to the current location 946 together with the vehicle ID 451.

In addition, the driving distance 452 from the departure location 944 to the current location 946, the driving route 949 from the departure location 944 to the destination 945, the driving time 453 from the departure location 944 to the current location 946, and the charging information 951 when charging is performed before reaching the current location 946 are stored as the vehicle information. The cloud server 230 causes the selector 332 to select a charging point and the generator 333 to generate charging point guide information based on these pieces of vehicle information that the receiver 331 receives from the smartphone 220.

The RAM 940 also stores a driving date 952 and a driving time zone 953 as the driving date/time information. The RAM 940 further stores traffic jam information 954 and a traffic restriction 955 as the traffic information. The cloud server 230 selects a charging point and generates charging point guide information based on these pieces of information receive from the smartphone 220. The RAM 940 also stores a weather 961, an outside temperature 962 during driving, an outside humidity 963 during driving, a wind direction 964, a wind velocity 965, a precipitation 966, and the like as the driving environment information. The RAM 940 further stores a tire pressure 971, a tire wear level 972, a tire exchange time 973, an oil amount 974, an oil contamination 975, an oil exchange time 976, and the like as the vehicle maintenance information. The cloud server 230 causes the calculator 335 to calculate the battery consumption or battery consumption characteristic based on these pieces of information receive from the smartphone 220.

The storage 980 stores the charging point 981 installed along a road or in a facility, and the driving history information 983, the charging history information 984, and the battery consumption characteristic 985 linked with the vehicle ID 451. The driving history information is a history representing when and where the vehicle drove in what kind of state at what kind of speed. The selector 332 predicts the battery consumption based on the driving history information and selects a charging point based on the battery level and the battery consumption. The charging history information is information representing when and where charging was performed. The selector 332 selects a charging point based on not only the driving history information but also the charging history information.

The storage 980 also stores a driver name 987, a driver's license number 988, and vehicle operation characteristic information 989 linked with a user ID 986. The vehicle operation characteristic information 989 is information including vehicle operation characteristics such as a driver's accelerator operation, a braking operation, and the degree of air conditioning effectiveness. The selector 332 selects a charging point based on the driver name 987, the driver's license number 988, the vehicle operation characteristic information 989, and the battery consumption characteristic of the electric vehicle 210 during driving. The storage 980 further stores the charging point acquisition module 991, the charging point guide information generation module 992, and the battery consumption characteristic calculation module 994.

When, for example, the charging point 981 is newly installed, or an existing charging point has undergone expansion of equipment, the charging point acquisition module 991 acquires the information of the charging point. The storage 336 stores information about a charging point received from another user or the like. The charging point guide information generation module 992 functions as the generator 333 that generates charging point guide information indicating, on the driving route 949, the charging point 981 selected by the selector 332. The battery consumption calculation module 993 functions as the calculator 335 that calculates the battery consumption of the electric vehicle 210 from vehicle information, driving date/time information, traffic information, and driving environment information. The battery consumption characteristic calculation module 994 functions as the calculator 335 that calculates the battery consumption characteristic of the electric vehicle 210 from vehicle information, driving date/time information, traffic information, and driving environment information.

(Procedure of Processing of Cloud Server 230)

Figure 10A:
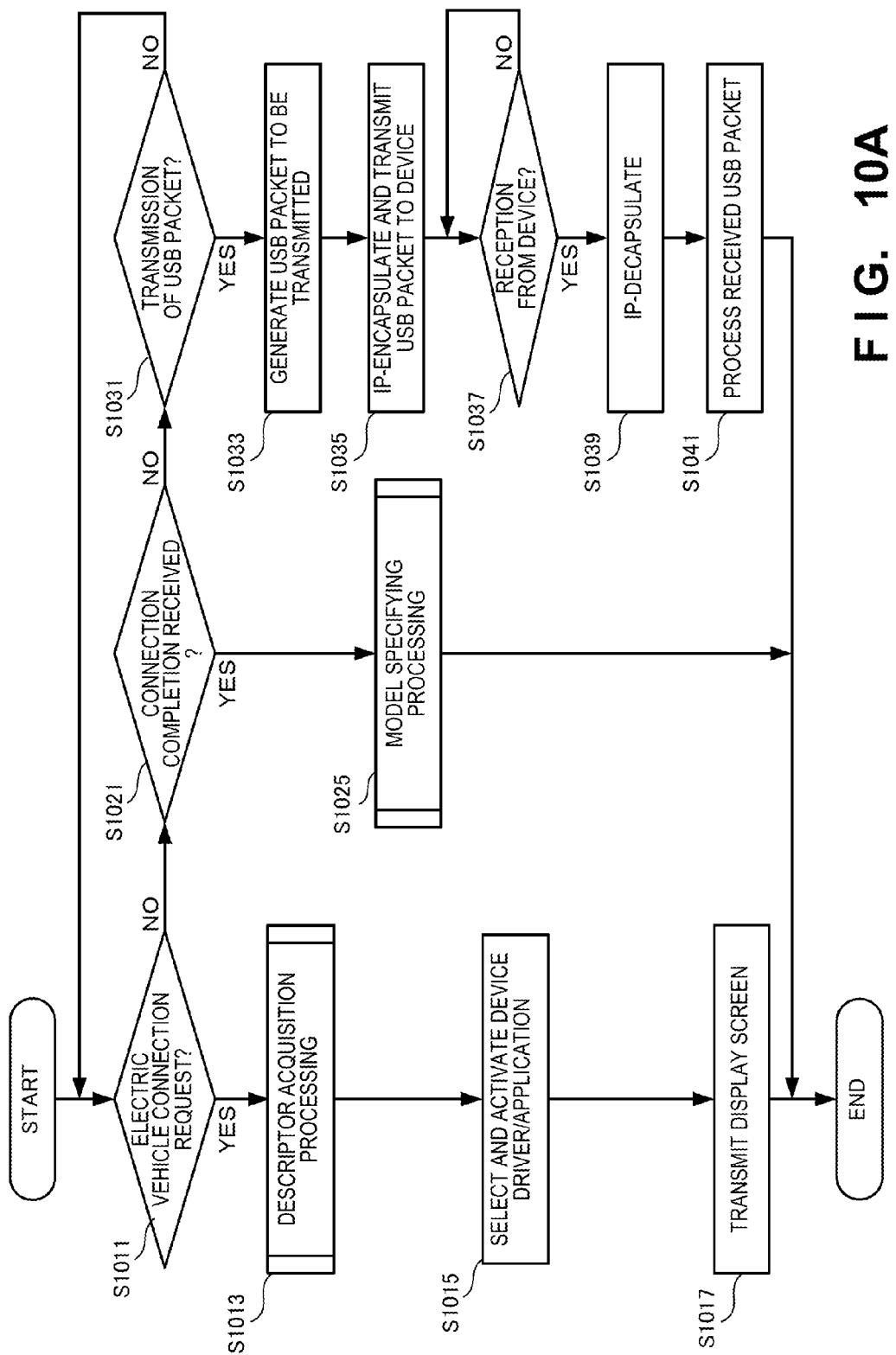
FIG. 10A is a flowchart showing the procedure of processing of the cloud server according to the second embodiment of the present invention.

A detailed procedure of processing of the cloud server 230 will be described with reference to FIG. 10A. Upon determining in step S1011 that a request to connect the electric vehicle 210 is received from the smartphone 220, the process advances to step S1013 to perform descriptor acquisition processing. A device driver and an application program are selected and activated based on a selected descriptor. Along with execution of the application program, a predetermined display screen is transmitted to the smartphone 220.

Upon determining in step S1021 that an electric vehicle connection completion notification is received, model specifying processing is performed in step S1025.

Upon determining in step S1031 to transmit a USB packet, the process advances to step S1033 to generate a USB packet to be transmitted. In step S1035, the USB packet is IP-encapsulated and transmitted to the electric vehicle. After that, reception from the electric vehicle is waited (S1037). When a USB packet is received, it is IP-decapsulated (S1039), and the received USB packet is processed (S1041).

(Descriptor Acquisition Method)

Figure 10B:
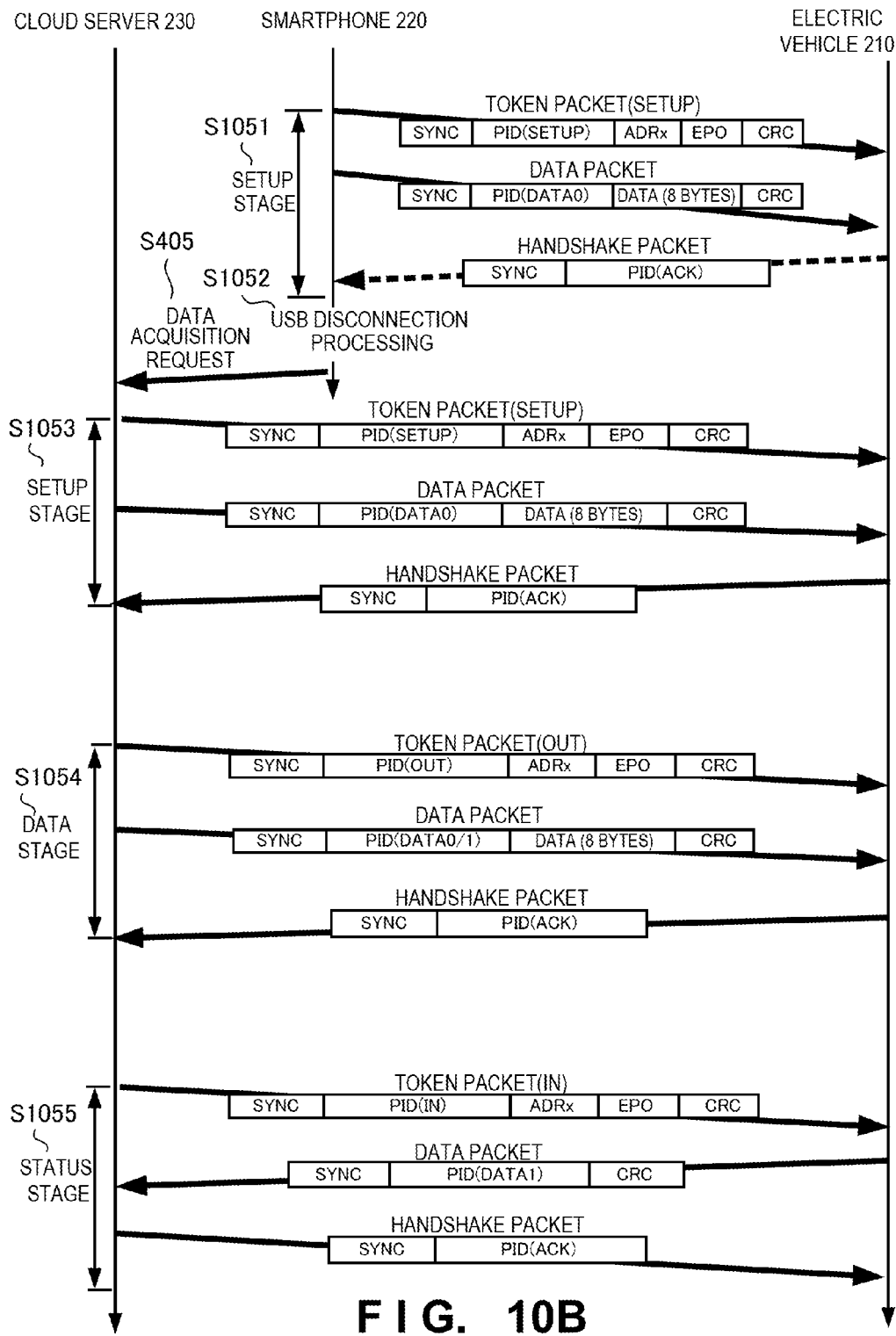
FIG. 10B is a sequence chart showing an example of packet transmission/reception processing of the information processing system according to the second embodiment of the present invention.
Figure 10C:
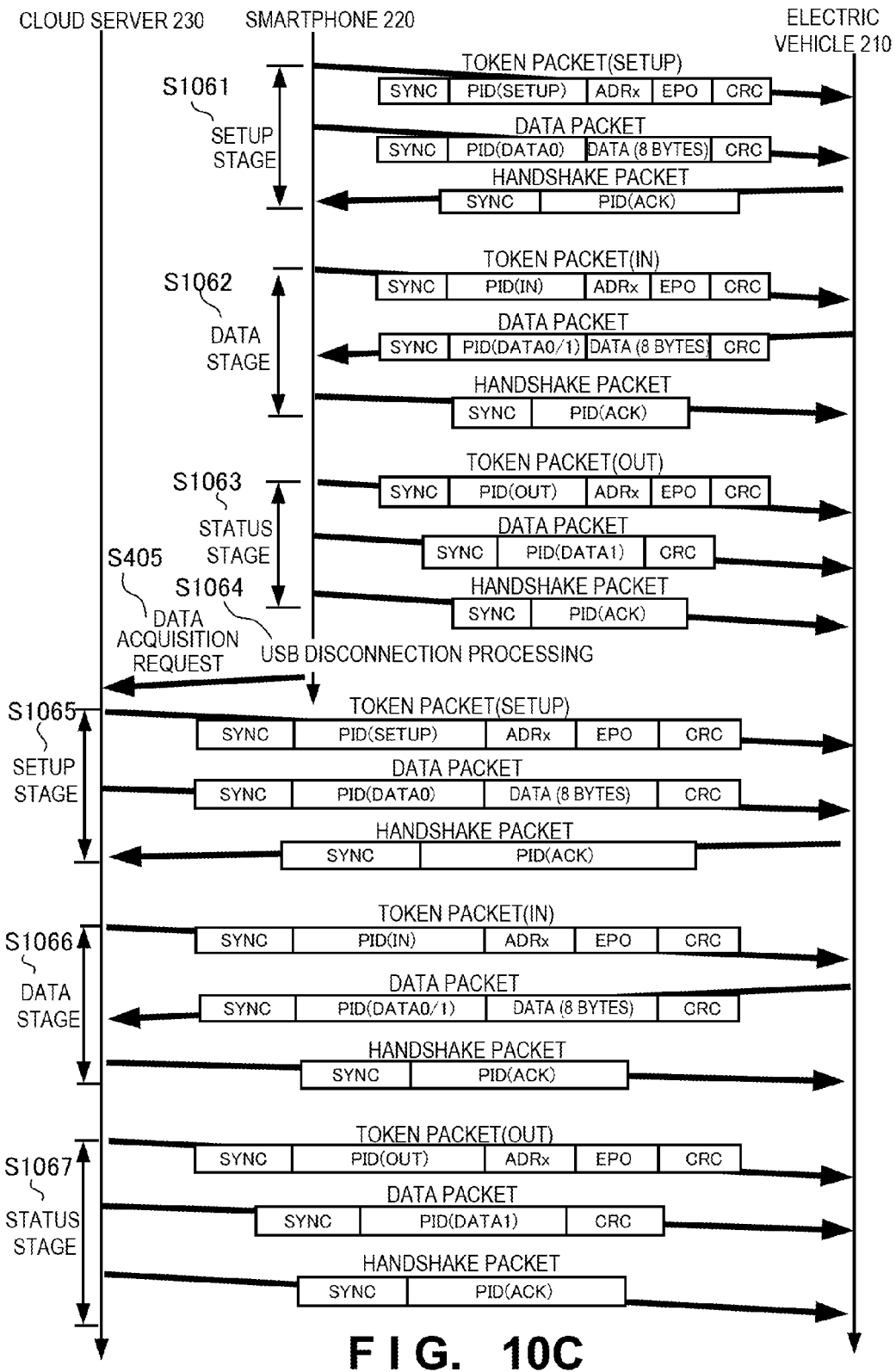
FIG. 10C is a sequence chart showing another example of packet transmission/reception processing of the information processing system according to the second embodiment of the present invention.
Figure 10D:
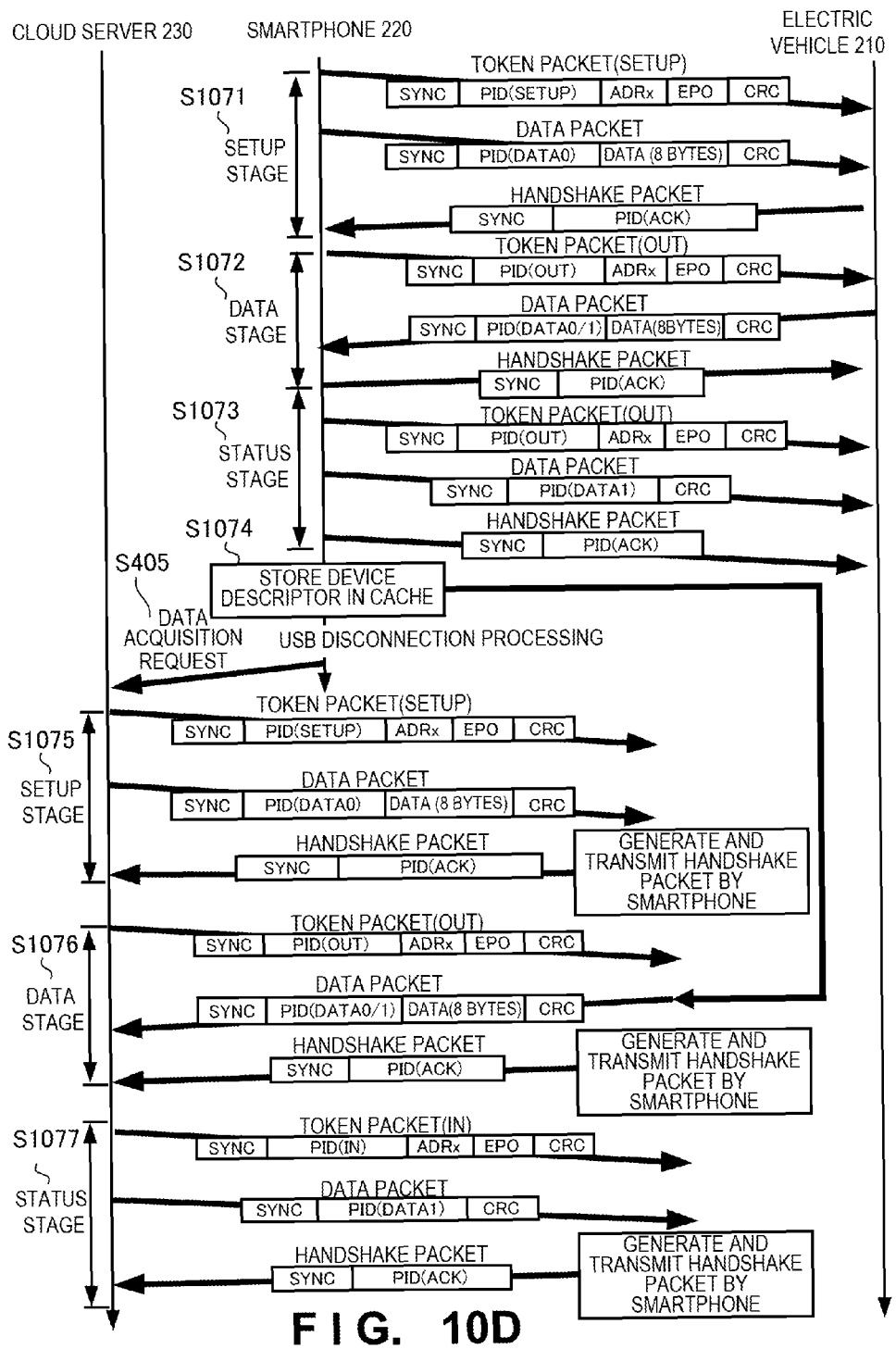
FIG. 10D is a sequence chart showing still another example of packet transmission/reception processing of the information processing system according to the second embodiment of the present invention.

FIGS. 10B, 10C, and 10D are views for explaining descriptor exchange described concerning step S1013 in more detail. These drawings show packet data exchanged between the cloud server 230, the smartphone 220, and the electric vehicle 210.

Referring to FIG. 10B, when the smartphone 220 and the electric vehicle 210 are connected, the smartphone 220 transmits a token packet and a data packet to the electric vehicle 210 in a setup stage S1051. In response to this, the electric vehicle 210 transmits a handshake packet to the smartphone 220. It is determined depending on whether a proper handshake packet is returned whether the local device can control the electric vehicle 210.

For example, the electric vehicle 210 that is assumed in advance to be connected to the smartphone 220 returns a proper handshake packet, and a data stage and a status stage continue. The smartphone 220 can control the input and output devices by driving a device driver prepared in it in correspondence with a thus acquired device descriptor. However, only few electric vehicles 210 assume connection of the smartphone 220. If no handshake packet is returned in the setup stage S1051, USB disconnection processing is performed (S1052), and the smartphone 220 sends a data acquisition request to the cloud server 230 (S405).

Next, the cloud server 230 performs a setup stage S1053 again with respect to the electric vehicle 210 again via the smartphone 220 and advances to a data stage S1054, thereby acquiring device information such as a device descriptor. The cloud server 230 includes many drivers and data conversion modules in advance so as to be connectable to various electric vehicles 210 existing in the society. For this reason, the setup stage S1053, the data stage S1054, and a status stage S1055 smoothly progress between the cloud server 230 and the electric vehicle 210, and connection to the electric vehicle 210 is properly established.

FIG. 10C illustrates the sequence when the smartphone 220 does not hold a driver corresponding to the device descriptor acquired from the electric vehicle 210, although the electric vehicle 210 has returned the handshake packet. In this case, a setup stage S1061, a data stage S1062, and a status stage S1063 are performed between the smartphone 220 and the electric vehicle 210. Upon determining by the three stages that the smartphone 220 does not hold a driver corresponding to the acquired device descriptor, USB disconnection processing S1064 is performed. The smartphone 220 sends a data acquisition request to the cloud server 230 (S405).

The smartphone 220 requests the cloud server 230 to connect the electric vehicle 210. After the USB connection between the smartphone 220 and the electric vehicle 210 is disconnected, the cloud server 230 performs a setup stage S1065, a data stage S1066, and a status stage S1067 again. The cloud server 230 can thus acquire the device descriptor directly from the electric vehicle 210 and drive a driver corresponding to the device.

FIG. 10D illustrates processing when caching, in the smartphone 220, a device descriptor acquired in a setup stage S1071 and a data stage S1072 between the smartphone 220 and the electric vehicle 210. Before USB disconnection processing, the acquired device descriptor is cached in the smartphone 220 (S1074), and the smartphone 220 sends a data acquisition request to the cloud server 230 (S405).

After the smartphone 220 and the electric vehicle 210 are temporarily disconnected, connection establishment processing to the electric vehicle 210 is started under the initiative of the cloud server 230 (S1075 to S1077). In this case, in the setup stage S1075, the smartphone 220 generates a handshake packet and transmits it to the cloud server 230 without sending a token packet and a data packet for setup to the electric vehicle 210. In the data stage S1076, upon receiving the token packet and the data packet from the cloud server 230, the smartphone 220 reads out the device descriptor from the cache and transmits it to the cloud server 230 without sending the packets to the electric vehicle 210. That is, since processing of acquiring the device descriptor from the electric vehicle 210 can be omitted, resumption after disconnection of communication with the electric vehicle 210 can efficiently be performed.

(Electric Vehicle Model Specifying Table)

As shown in FIG. 10E, the smartphone 220 stores a table 1080 representing the correspondence relationship between a device descriptor including a device driver, an interface descriptor, a vendor ID, and a product ID.

The smartphone 220 compares a device descriptor notified by the electric vehicle 210 when the electric vehicle 210 is connected with a device descriptor in the table 1080. If the device descriptor notified by the electric vehicle 210 matches the device descriptor in the table 1080, the smartphone 220 determines that the electric vehicle 210 is a device processable by the local device. If the device descriptors do not match, the smartphone 220 determines that the electric vehicle 210 is a device unprocessable by the local device.

Note that a vendor ID and a product ID in the device descriptor notified by the electric vehicle 210 may be extracted and compared with a vendor ID and a product ID in the table 1080. In this case, if a matching vendor ID and product ID7 exist in the table 1080, it can be determined that the electric vehicle 210 is a device processable by the local device. Reversely, if the vendor ID and the product ID do not match, the smartphone 220 can determine that the electric vehicle 210 is unprocessable by the local device.

(USB Connection Processing)

Signals exchanged between the cloud server 230, the smartphone 220, and the electric vehicle 210 until communication by USB is established will be described in more detail with reference to FIGS. 11A to 11D. In particular, an example in which the device descriptor is stored in a cache, as shown in FIG. 10D, will be described here.

In step S1101, the electric vehicle 210 is connected to the smartphone 220. In step S1102, the smartphone 220 starts USB connection processing to the electric vehicle 210 and transmits a reset signal. In step S1103, the smartphone 220 designates an address to the electric vehicle 210. After this, the address is added to each packet to be exchanged between the smartphone 220 and the electric vehicle 210.

In step S1104, the smartphone 220 performs processing "GET DESCRIPTOR" to acquire a descriptor from the electric vehicle 210. The processing "GET DESCRIPTOR" is the same as in steps S1071 to S1073 described with reference to FIG. 10D, and a detailed description thereof will be omitted. When a descriptor request is transmitted to the electric vehicle 210 (S1105), the electric vehicle 210 transmits a device descriptor stored in the endpoint 0 area to the smartphone 220 (S1106 and S1107). In a status stage S1073, the smartphone 220 transmits an acknowledgement signal (ACK) to the electric vehicle 210.

The smartphone 220 that has acquired the device descriptor at this point of time stores the device descriptor in the cache (S1074). The smartphone 220 also determines using the device descriptor whether it can control the electric vehicle 210 (S403). Upon determining that the electric vehicle 210 is uncontrollable, the process advances to step S1111 to perform USB disconnection processing and simultaneously request the cloud server 230 to control the electric vehicle 210 (S1112).

In step S1113, the cloud server 230 starts processing to control the electric vehicle 210 and transmits a reset signal to the electric vehicle 210 via the smartphone 220. In step S1115, the cloud server 230 sets an address and designates the address for the electric vehicle 210.

The cloud server 230 performs GET DESCRIPTOR (S1116) and GET CONFIGURATION (S1124) for the electric vehicle 210 via the smartphone 220 (S1123). More specifically, in step S1117, the cloud server 230 sends a get descriptor to the smartphone 220. In step S1119, the smartphone 220 reads out the device descriptor stored in the cache and transmits it to the cloud server 230.

In step S1125, the electric vehicle 210 transmits a configuration descriptor stored in the endpoint 0 area. When the cloud server 230 performs BULK TRANSFER to the electric vehicle 210 via the smartphone 220 (S1126), the electric vehicle 210 reads out vehicle information and the like stored in the storage 336 (S1127) and transmits them to the cloud server 230.

Figure 11A:
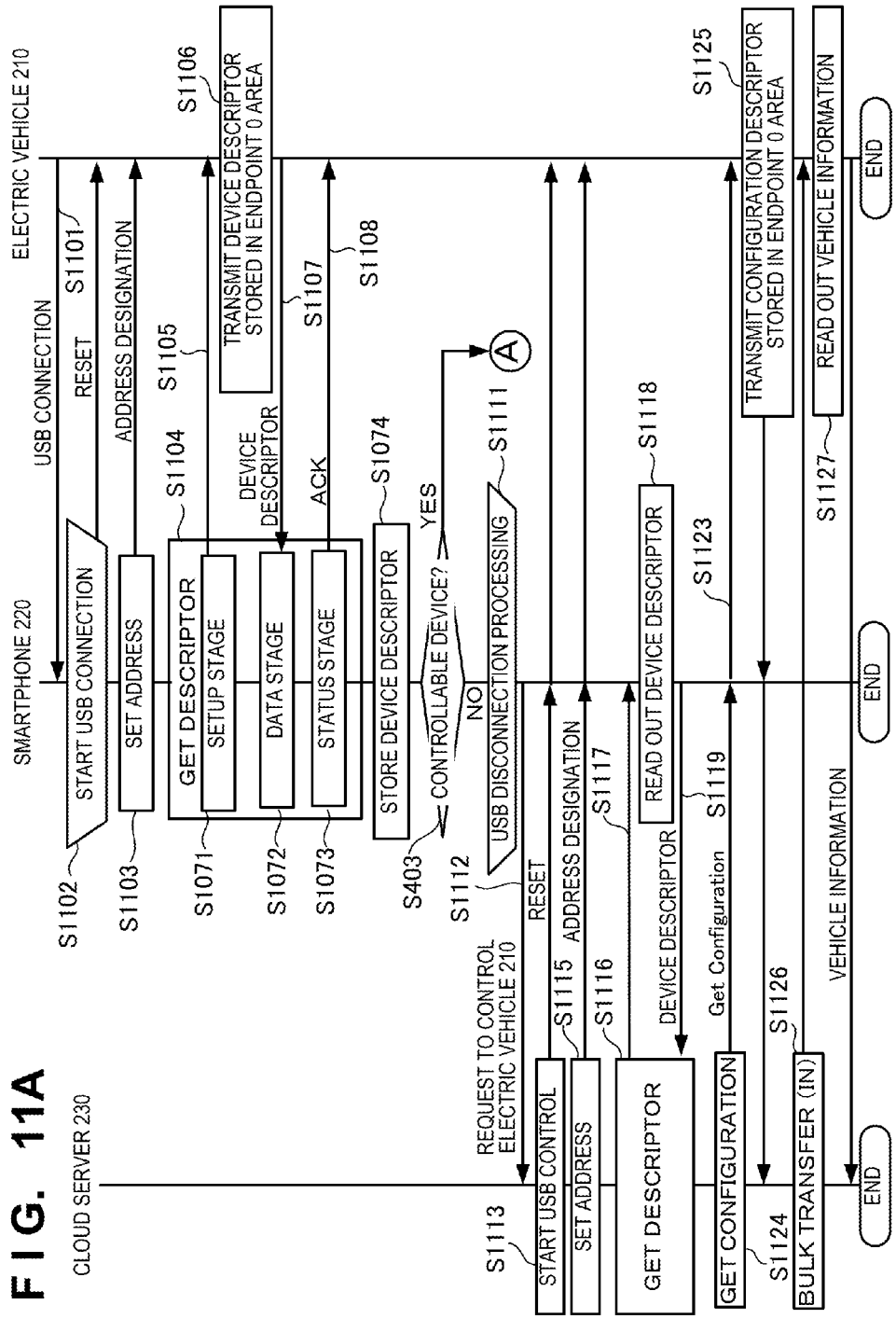
FIG. 11A is a flowchart showing an example of communication establishment processing between the server and the electric vehicle in the information processing system according to the second embodiment of the present invention.
Figure 11B:
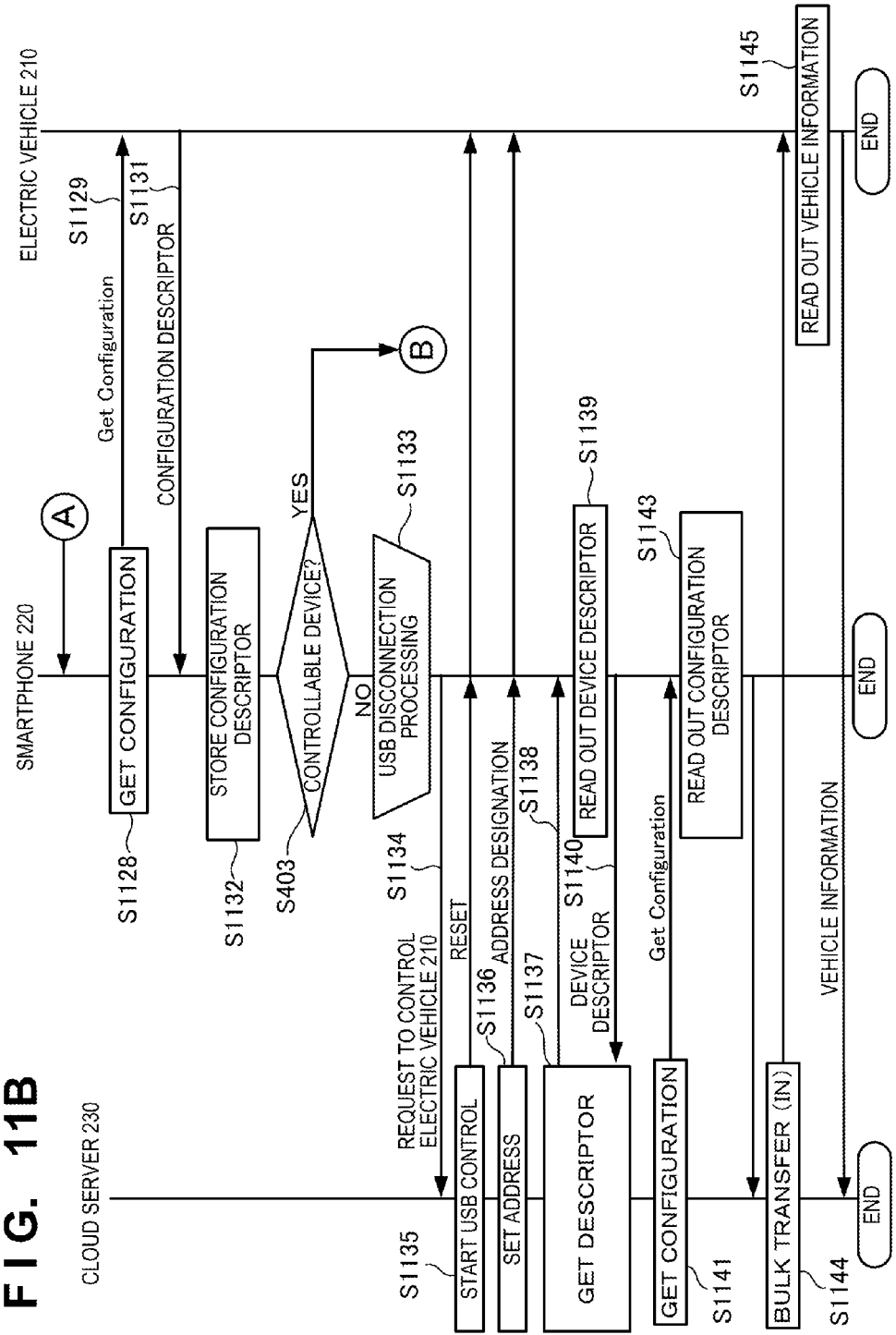
FIG. 11B is a flowchart showing an example of communication establishment processing between the server and the electric vehicle in the information processing system according to the second embodiment of the present invention.

Upon determining in step S403 based on the device descriptor of the electric vehicle 210 that the electric vehicle 210 is not a controllable device, the process advances to step S1128 of FIG. 11B. In steps S1128 and S1129, configuration descriptor acquisition processing is performed. In response to this, the electric vehicle 210 transmits a configuration descriptor to the smartphone 220. In step S1132, the smartphone 220 stores the acquired configuration descriptor in the cache. In step S403, the smartphone 220 also determines based on the configuration descriptor whether the electric vehicle 210 is a controllable device for the smartphone 220. Upon determining that the electric vehicle 210 is uncontrollable, the process advances to step S1133 to disconnect USB connection between the smartphone 220 and the electric vehicle 210.

After the USB connection is disconnected, the smartphone 220 requests the cloud server 230 to control the electric vehicle 210. In response to the control request, the cloud server 230 starts USB control and transmits a reset signal to the electric vehicle 210 via the smartphone 220 (S1135). Next, the cloud server 230 sets an address (S1136) and designates the address for the electric vehicle 210. When the cloud server 230 requests the smartphone 220 to send a descriptor in GET DESCRIPTOR (S1137), the smartphone 220 reads out the device descriptor from the cache (S1139) and returns it to the cloud server 230 (S1140), instead of relaying the request to the electric vehicle 210.

When the cloud server 230 performs GET CONFIGURATION for the electric vehicle 210 via the smartphone 220 (S1141), the smartphone 220 reads out the configuration descriptor stored in the cache and transmits it to the cloud server 230 (S1143), instead of transmitting the command to the electric vehicle 210. When the cloud server 230 performs BULK TRANSFER to the electric vehicle 210 via the smartphone 220 (S1144), the electric vehicle 210 reads out vehicle information stored in the storage 336 (S1145) and transmits it to the cloud server 230 via the smartphone 220.

Upon determining in step S403 based on the configuration descriptor that the electric vehicle is a controllable device (B), the process advances to BULK TRANSFER in step S1146 of FIG. 11C. In the BULK TRANSFER as well, the setup stage, the data stage, and the status stage are performed, and the electric vehicle 210 thus reads out vehicle information from the storage 336 and transmits it to the smartphone 220 (S1149).

Upon receiving the readout vehicle information, the smartphone 220 stores it in the cache (S1151).

Figure 11D:
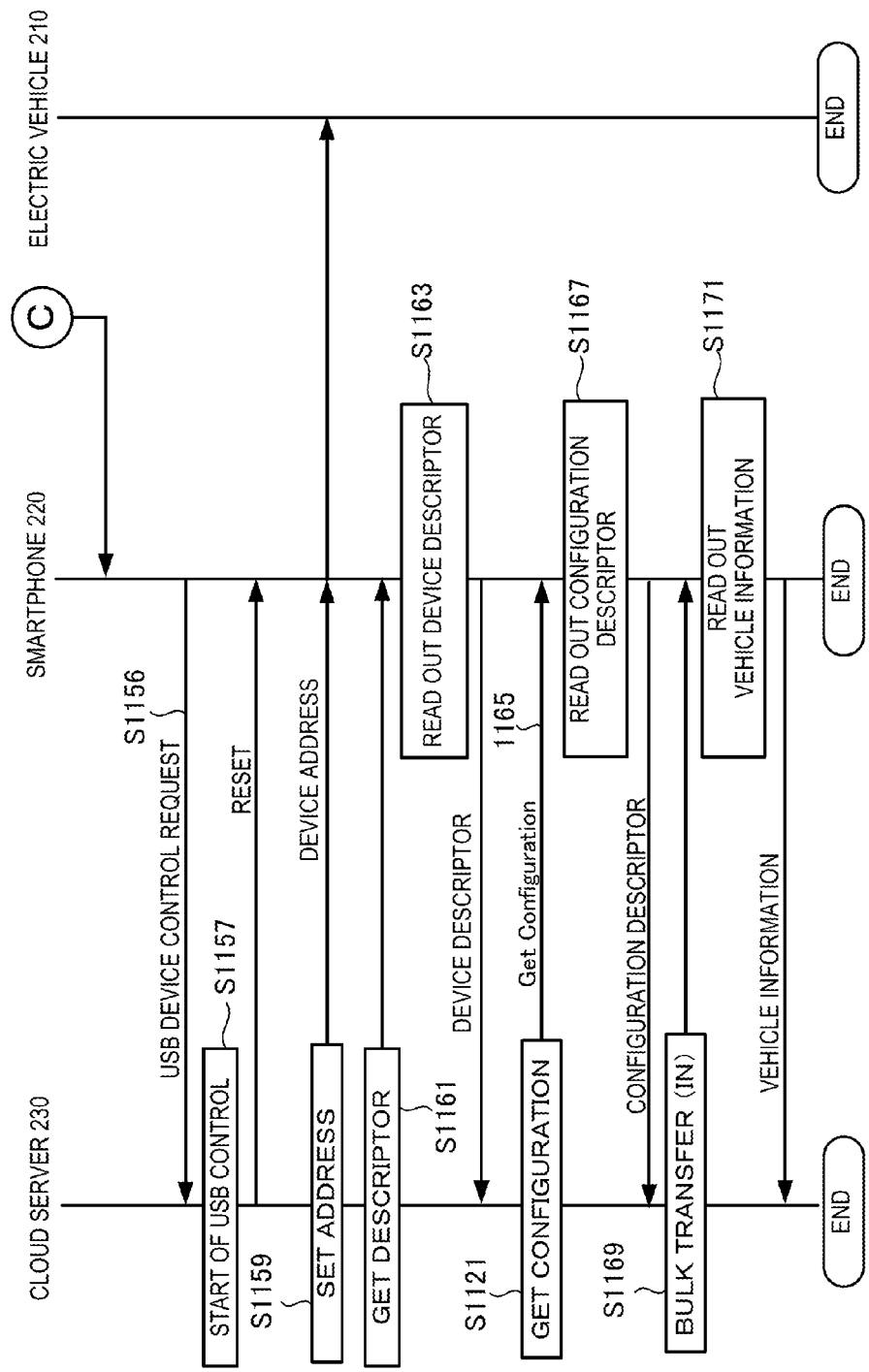
FIG. 11D is a flowchart showing an example of communication establishment processing between the server and the electric vehicle in the information processing system according to the second embodiment of the present invention.

When the smartphone 220 stores the vehicle information of the electric vehicle 210 in the cache, the process advances to step S1154 to perform USB disconnection processing and then advances to step S1156 of FIG. 11D.

In step S1156 of FIG. 11D, the cloud server 230 is requested to control the USB device again. The smartphone 220 requests the cloud server 230 to control the electric vehicle 210. In response to the control request, the cloud server 230 starts USB control and transmits a reset signal to the electric vehicle 210 via the smartphone 220 (S1157). Next, the cloud server 230 sets an address (S1159) and designates the address for the electric vehicle 210. When the cloud server 230 requests the smartphone 220 to send a descriptor in GET DESCRIPTOR (S1161), the smartphone 220 reads out the device descriptor from the cache (S1163) and returns it to the cloud server 230, instead of relaying the request to the electric vehicle 210.

When the cloud server 230 performs GET CONFIGURATION for the electric vehicle 210 via the smartphone 220 (S1165), the smartphone 220 reads out the configuration descriptor stored in the cache and transmits it to the cloud server 230 via the smartphone 220 (S1167), instead of relaying the command.

When the cloud server 230 performs BULK TRANSFER to the electric vehicle 210 via the smartphone 220 (S1169), the smartphone 220 reads out vehicle information stored in the cache (S1171) and transmits it to the cloud server 230.

With the above-described sequence, it is possible to efficiently perform communication between the cloud server 230 and the electric vehicle 210 effectively using the cache of the smartphone 220.

With the above-described arrangement and operation, it is possible to provide a power source replenishment point notification based on the driving history information of the vehicle and provide comfortable drive.

[Third Embodiment]

Figure 12:
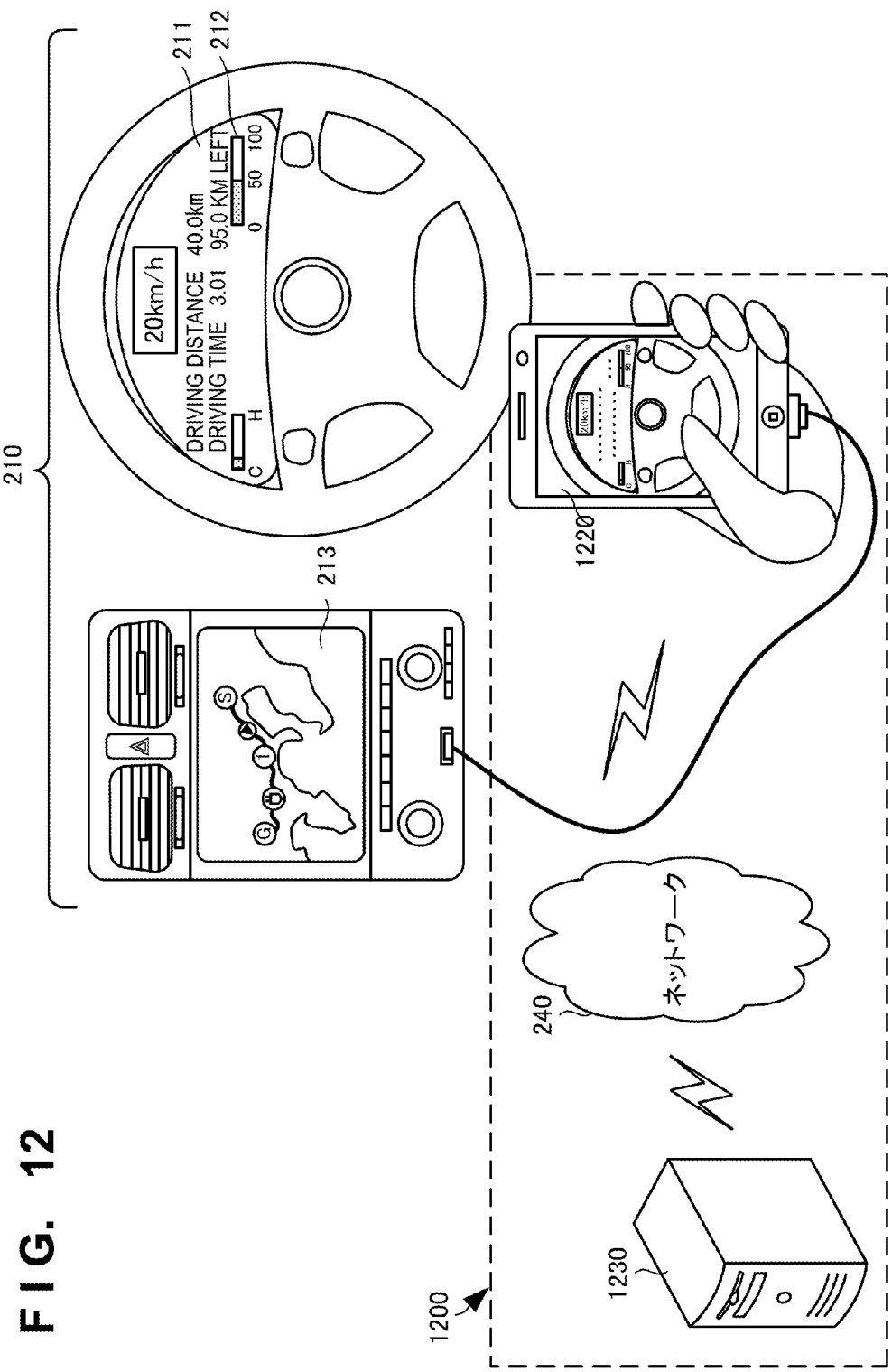
FIG. 12 is a view showing the outline of an information processing system according to the third embodiment of the present invention.
Figure 13:
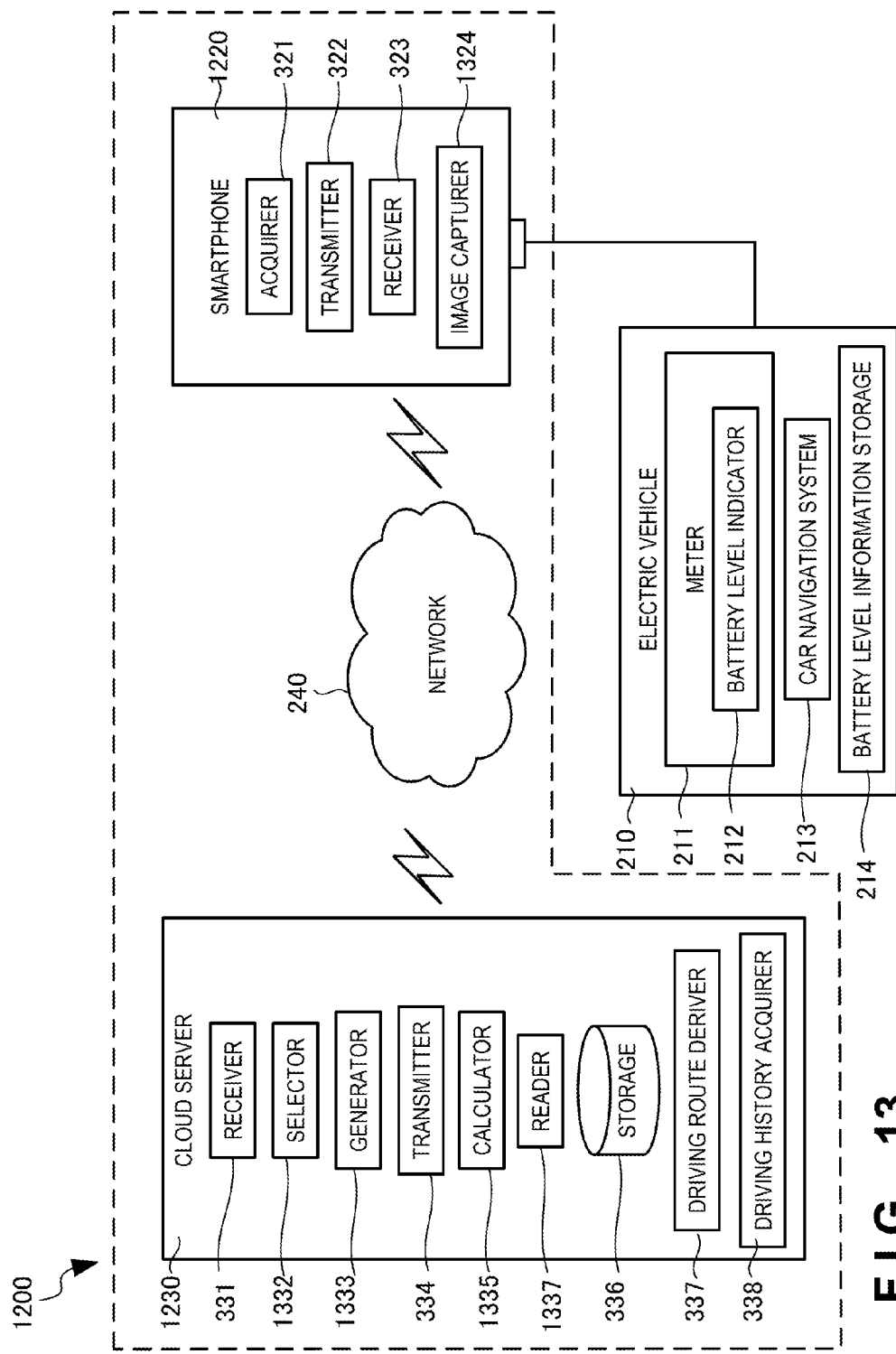
FIG. 13 is a block diagram showing the arrangement of the information processing system according to the third embodiment of the present invention.

An information processing system 1200 according to the third embodiment of the present invention will be described next with reference to FIGS. 12 and 13. FIG. 12 is a view for explaining the outline of the information processing system 1200 according to this embodiment. FIG. 13 is a block diagram showing the arrangement of the information processing system 1200 according to this embodiment. The information processing system 1200 according to this embodiment is different from the second embodiment in that an image of the interior of an electric vehicle, which is captured by the image capturer of a smartphone, is transmitted to a cloud server, thereby reading out necessary vehicle information from the image, instead of transmitting vehicle information such as a battery level and a driving distance from the electric vehicle to the smartphone. The rest of the components and operations is the same as in the second embodiment. Hence, the same reference numerals denote the same components and operations, and a detailed description thereof will be omitted.

The information processing system 1200 includes a smartphone 1220 and a cloud server 1230. The smartphone 1220 is communicably connected to the cloud server 1230 via the network 240. The smartphone 1220 is communicably connected to an electric vehicle 210.

Referring to FIG. 12, the smartphone 1220 captures a meter 211 and a battery level indicator 212 of the electric vehicle 210 and transmits the image data of the captured image to the cloud server 1230 via the network 240. The cloud server 1230 reads, for example, a driving speed of 20.0 km/h, a driving distance of 40.0 km, and a driving time of 3 hrs 1 min displayed on the meter 211 from the received image data. The cloud server 1230 also reads that the battery level indicated by the battery level indicator 212 is 50%, and the drivable distance is 95.0 km. The cloud server 1230 selects a charging point 981 based on the read information of the image data and generates charging point guide information based on the selected charging point 981. The cloud server 1230 transmits the generated charging point guide information from a transmitter and transmits it to the smartphone 1220 via the network 240. The smartphone 1220 receives the charging point guide information transmitted from the cloud server 1230 and transmits it to the electric vehicle 210.

The arrangement of the information processing system 1200 will be described with reference to the block diagram of FIG. 13. The smartphone 1220 includes an image capturer 1324. The image capturer 1324 captures the meter 211 and the battery level indicator 212 of the electric vehicle 210. A transmitter 1323 transmits the captured image data to the cloud server 1230. A reader 1337 of the cloud server 1230 reads vehicle information such as a driving speed and driving distance from the image data received by a receiver 331. A calculator 1335 calculates a battery consumption characteristic and a battery consumption based on the read vehicle information and driving date/time information and the like. A selector 1332 selects a charging point based on the calculated battery consumption. A generator 1333 generates charging point guide information that displays the selected charging point.

As described above, the charging point guide information can be updated at the timing when the image data captured by the smartphone 1220 is transmitted to the cloud server 1230. For this reason, the charging point guide information can easily be updated, for example, at a timing of waiting at a traffic light or at a timing of taking a rest.

With the above arrangement and operation, according to the information processing system 1200 of this embodiment, vehicle information can be acquired based on image information captured using the image capturer of the smartphone. It is therefore possible to acquire the charging point guide information at a timing desired by the user.

[Fourth Embodiment]

Figure 14:
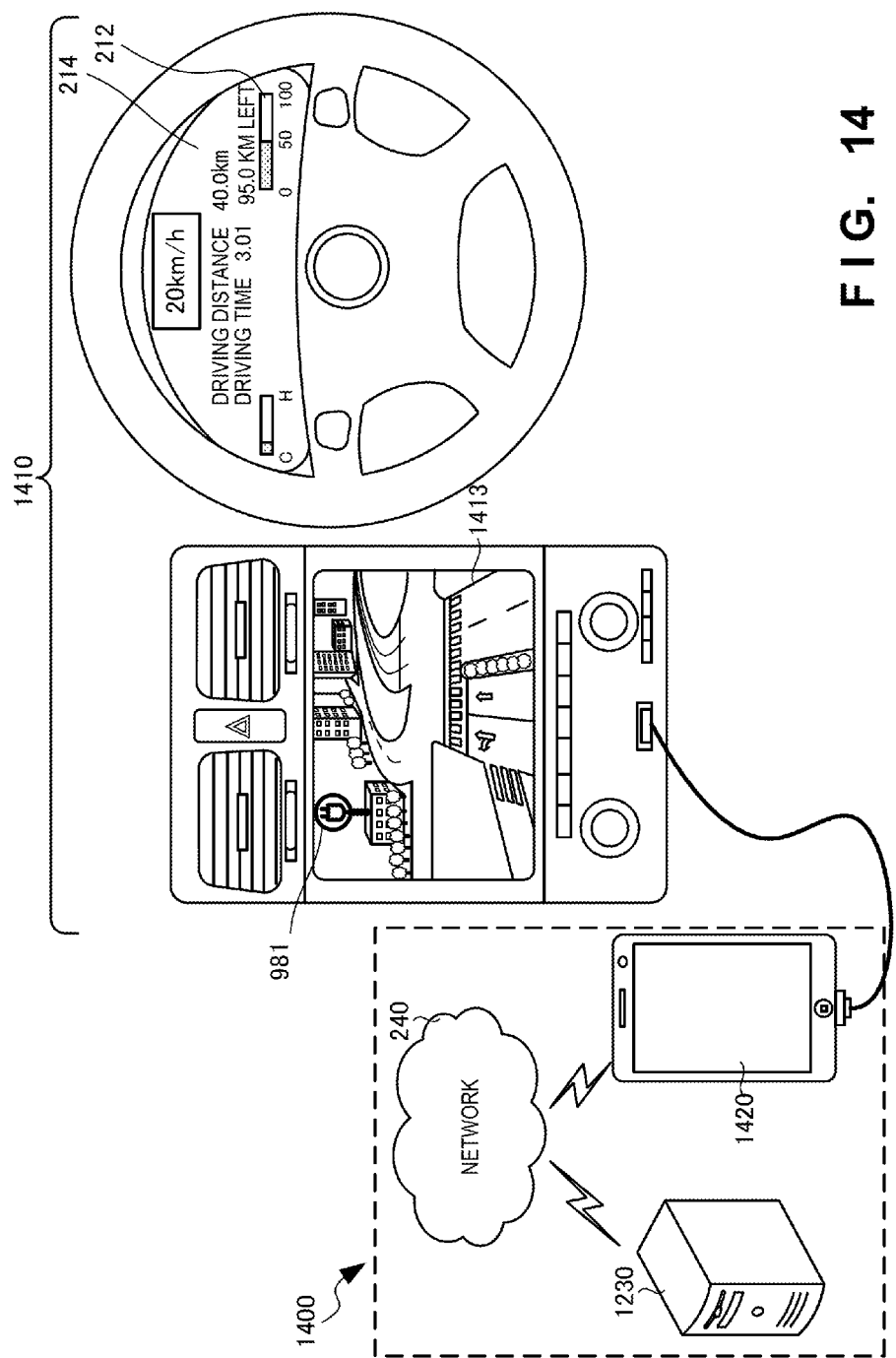
FIG. 14 is a view showing the outline of an information processing system according to the fourth embodiment of the present invention.

An information processing system 1400 according to the fourth embodiment of the present invention will be described next with reference to FIGS. 14 and 15. FIG. 14 is a view for explaining the outline of the information processing system 1400 according to this embodiment. FIG. 15 is a block diagram showing the arrangement of the information processing system 1400 according to this embodiment. The information processing system 1400 according to this embodiment is different from the second embodiment in that a cloud server generates charging point guide information as a three-dimensional (3D) image. The rest of the components and operations is the same as in the second embodiment. Hence, the same reference numerals denote the same components and operations, and a detailed description thereof will be omitted.

The information processing system 1400 includes a smartphone 1420 and a cloud server 1430. The smartphone 1420 is communicably connected to the cloud server 1430 via a network 240. The smartphone 1420 is communicably connected to an electric vehicle 1410.

Referring to FIG. 14, the smartphone 1420 transmits vehicle information, driving date information, traffic information, and the like acquired from the electric vehicle 1410 to the cloud server 1430 via the network 240.

The cloud server 1430 three-dimensionally generates charging point guide information indicating a charging point 981 as a 3D video on a driving route 949 from a current location 946 to a destination 945 based on the received vehicle information and the like. The cloud server 1430 transmits the 3D image data of the generated charging point guide information to the smartphone 1420. When the smartphone 1420 transmits the received 3D image data to the electric vehicle 1410, the charging point guide information is displayed on a car navigation system 1413 as a 3D image.

The arrangement of the information processing system 1400 will be described with reference to the block diagram of FIG. 15. A receiver 331 of the cloud server 1430 receives vehicle information, driving date/time information, traffic information, vehicle maintenance information, and the like transmitted from the smartphone 1420. A generator 1533 generates, as a 3D image, charging point guide information indicating a charging point selected by a selector 332 based on the received information on the driving route 949. A transmitter 1534 transmits the data of the generated 3D image to the smartphone 1420.

When the smartphone 1420 transmits the received 3D image data to the electric vehicle 1410, the car navigation system 1413 of the electric vehicle 1410 displays the 3D image of the charging point guide information (1413 of FIG. 11).

As described above, when the driving route 949 indicating the charging point guide information is displayed on the car navigation system 1413 using a 3D image, the charging point can easily be recognized.

With the above arrangement and operation, according to the information processing system 1400 of this embodiment, charging point guide information generated using vehicle information and the like transmitted from the smartphone can be displayed on the car navigation system as a 3D image. It is therefore possible to reach the charging point without getting lost even when visiting a place for the first time.

[Fifth Embodiment]

Figure 16:
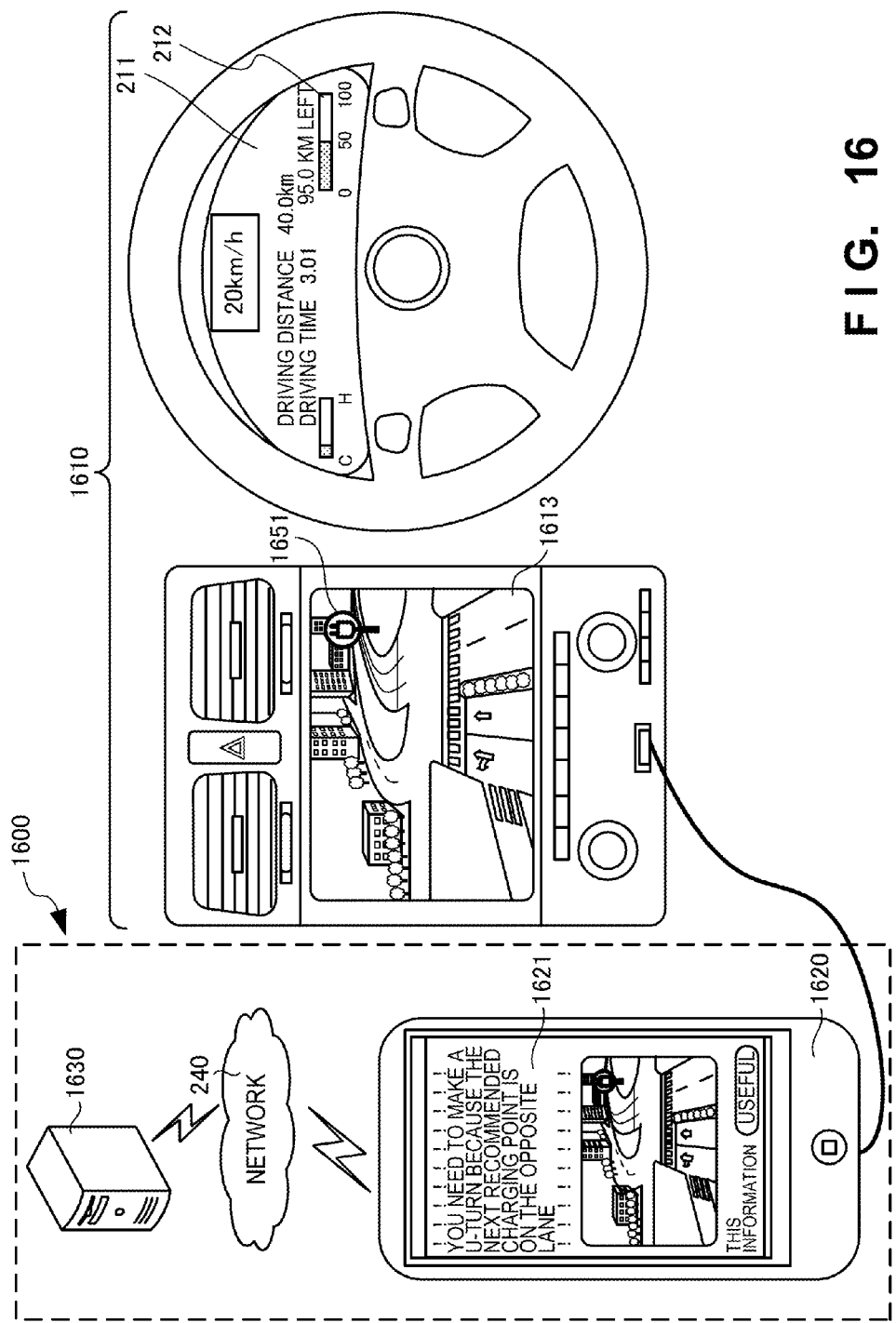
FIG. 16 is a view showing the outline of an information processing system according to the fifth embodiment of the present invention.

An information processing system 1600 according to the fifth embodiment of the present invention will be described next with reference to FIG. 16. FIG. 16 is a view showing display information displayed on a screen 1601 of a smartphone 1620 according to this embodiment.

The information processing system 1600 according to this embodiment is different from the fourth embodiment in that the degree of driving difficulty or the degree of risk concerning a charging point is added by a video or voice to charging point guide information generated by a cloud server. The rest of the components and operations is the same as in the fourth embodiment. Hence, the same reference numerals denote the same components and operations, and a detailed description thereof will be omitted.

The information processing system 1600 includes the smartphone 1620 and a cloud server 1630. The smartphone 1620 is communicably connected to the cloud server 1630 via a network 240. The smartphone 1620 is communicably connected to an electric vehicle 1610.

Referring to FIG. 16, the cloud server 1630 stores evaluations sent from other users in association with roads to access a charging point 1651, derives the attribute (degree of driving difficulty or degree of risk) of the charging point using the evaluations, and transmits it to the smartphone 1620. The cloud server 1630 also adds attribute information (information about the degree of driving difficulty or degree of risk) to the driving route from the current location to the destination on which the charging point 1651 is displayed, thereby generating charging point guide information.

For example, assume that the charging point 1651 is located on the opposite lane, and a U-turn is needed to use it, as shown on a car navigation system 1613. In this case, the cloud server 1630 generates and transmits display screen data so that a comment "you need to make a U-turn because the next recommended charging point is on the opposite lane" is displayed on a display screen 1621 of the smartphone 1620. More specifically, the cloud server 1630 receives evaluations about the degree of driving difficulty on a scale of 1 to 5 by other users in advance, as in the case where the charging point 1651 on the opposite lane is used. The cloud server 1630 calculates the degree of driving difficulty based on the received evaluation results. The selector ranks the charging points using the degree of driving difficulty representing the difficulty in driving, and selects a recommended charging point. Note that an example of a road of high degree of driving difficulty is a road designated as a school zone. Examples of roads of high degree of risk are a road where a reckless driver frequently appears at night, a road where an elderly person wandering due to dementia has been confirmed, a road where an accident often occurs, and a road where a sudden change in the weather like "unexpected strong rain" increases the risk of accident during navigation.

With the above arrangement and operation, according to the information processing system 1600 of this embodiment, charging point guide information including knowledge of road states acquired from users can be presented via the car navigation system. Hence, the user can drive without anxiety even in an environment where he/she drives for the first time.

[Other Embodiments]

Note that in the above embodiments, the electric vehicle includes a solar car. Although an electric vehicle has been exemplified in the above embodiments, the present invention is not limited to this. For example, the power source replacing electric power may be hydrogen or gasoline. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a medium storing the program, and a WWW (World Wide Web) server that causes a user to download the program.

This application claims the benefit of Japanese Patent Application No. 2012-125363 filed on May 31, 2012, which is hereby incorporated by reference herein in its entirety.

The invention claimed is:

1. An information processing system comprising a portable communication terminal and a server,
said portable communication terminal comprising:
a current location/destination information acquirer that acquires current location information and destination information of a vehicle;

a power source level information acquirer that acquires power source level information representing a remaining level of a power source of said vehicle; and a first transmitter that transmits the current location information, the destination information, and the power source level information to the server, and said server comprising:

a first receiver that receives the current location information, the destination information, and the power source level information;

an accumulator that accumulates past driving history information using said vehicle and a plurality of replenishment enable points representing positions where the power source of said vehicle can be replenished;

a selector that selects, based on the current location information, the destination information, and the power source level information, which are received, and the accumulated driving history information, a replenishment point representing a position where the power source of said vehicle should be replenished from the plurality of replenishment enable points;

a second transmitter that transmits information about the selected replenishment point to said portable communication terminal; and a generator that generates, when the selector selects a first replenishment point and a second replenishment point that is located far apart from the first replenishment point with respect to the vehicle and that provides the power source less expensively than at the first replenishment point, information representing a route for said vehicle to reach the second replenishment point and a minimum necessary replenishment amount of the power source to be replenished at the first replenishment point to reach the second replenishment point.

2. The information processing system according to claim 1, wherein said portable communication terminal further comprises:

a first receiver that receives, from said server, replenishment point guide information including the replenishment point and driving route information about a driving route up to the destination; and a presenter that presents the received replenishment point guide information to a user, and said server further comprises:

a deriver that derives the driving route information up to the destination based on the destination information and the current location information, wherein the generator generates the replenishment point guide information including the selected replenishment point and the driving route information up to the destination.

3. The information processing system according to claim 2, wherein said generator generates, as the replenishment point guide information, three-dimensional image information indicating the replenishment point on the driving route.

4. The information processing system according to claim 2, wherein said vehicle comprises a display that displays an image, and said presenter comprises a third transmitter that transmits the received replenishment point guide information to said vehicle, and causes said display to display the replenishment point and the driving route information included in the replenishment point guide information.

5. The information processing system according to claim 1, wherein said current location/destination information acquirer directly acquires the destination information in accordance with an operation on the portable communication terminal by the user.

6. The information processing system according to claim 1, wherein said current location/destination information acquirer acquires, from said server, the destination information registered in said server by the user in advance.

7. The information processing system according to claim 1, wherein said power source level information acquirer acquires information about at least one of an ID, the current location information, a driving speed, a driving distance, and a driving time of said vehicle in addition to the power source level information.

8. The information processing system according to claim 1, wherein the driving history information includes past driving date/time information, driving route information, driving speed information, and driving state information of said vehicle, said accumulator accumulates past driving state information of said vehicle, and said selector selects the replenishment point from the plurality of replenishment enable points registered in advance, further based on the past driving state information and current driving state information.

9. The information processing system according to claim 8, wherein the driving state information includes at least one of driving environment information about a driving environment of said vehicle, traffic information about a traffic jam/traffic restriction, and vehicle maintenance information about maintenance of said vehicle.

10. The information processing system according to claim 2, wherein said selector selects the replenishment point at one of a timing when the driving distance of said vehicle reaches a predetermined distance and a timing when the driving time of said vehicle reaches a predetermined time, and said generator generates the replenishment point guide information anew based on the replenishment point selected according to a correspondence relationship with one of the driving distance and the driving time.

11. The information processing system according to claim 1, wherein said accumulator accumulates past driving state information of one of a vehicle of the same model as said vehicle and a vehicle having the same performance in terms of driving capability as said vehicle in addition to past driving state information of said vehicle, and said selector selects the replenishment point from a plurality of replenishment enable points registered in advance, based on the past driving state information and current driving state information of one of the vehicle of the same model as said vehicle and the vehicle having the same performance in terms of driving capability as said vehicle.

12. The information processing system according to claim 1, wherein said power source level information acquirer comprises an image capturer that captures an interior of said vehicle.

13. The information processing system according to claim 1, wherein said accumulator further accumulates attribute information of each of the plurality of replenishment enable points, and said selector selects, further based on the attribute information, the replenishment point representing the position where the power source of said vehicle should be replenished.

14. The information processing system according to claim 1, wherein said vehicle comprises an electric vehicle, the power source comprises electric power, and the replenishment point comprises a charging point where the electric vehicle should be charged.

15. The information processing system according to claim 1, wherein said selector selects the replenishment point in accordance with an attribute of the replenishment enable point.

16. The information processing system according to claim 15, wherein the attribute comprises a type of a facility near the replenishment enable point.

17. The information processing system according to claim 15, wherein the attribute comprises an electricity rate at each replenishment enable point.

18. An information processing method comprising:
   causing a portable communication terminal to acquire current location information and destination information of a vehicle;
   causing the portable communication terminal to acquire power source level information representing a remaining level of a power source of the vehicle;
   causing the portable communication terminal to transmit the current location information, the destination information, and the power source level information to a server;
   causing the server to receive the current location information, the destination information, and the power source level information;
   causing the server to accumulate past driving history information using the vehicle and a plurality of replenishment enable points representing positions where the power source of the vehicle can be replenished;
   causing the server to select, based on the current location information, the destination information, and the power source level information, which are received, and the accumulated driving history information, a replenishment point representing a position where the power source of the vehicle should be replenished from the plurality of replenishment enable points;
   causing the server to transmit information about the selected replenishment point to the portable communication terminal; and
   causing the server to generate, when the server selects a first replenishment point and a second replenishment point that is located far apart from the first replenishment point with respect to the vehicle and that provides the power source less expensively than at the first replenishment point, information representing a route for said vehicle to reach the second replenishment point via the first replenishment point and a minimum necessary replenishment amount of the power source to be replenished at the first replenishment point to reach the second replenishment point.

19. A portable communication terminal capable of communicating with a server and a vehicle, comprising:
   a current location/destination information acquirer that acquires current location information and destination information of the vehicle;
   a power source level information acquirer that acquires power source level information representing a remaining level of a power source of the vehicle;
   a first transmitter that transmits the current location information, the destination information, and the power source level information to the server;
   a presenter that presents, to a user, a replenishment point representing a position where the power source of the vehicle should be replenished; and
   a receiver that receives, from the server, information representing a route for said vehicle to reach a second replenishment point via a first replenishment point and a minimum necessary replenishment amount of the power source to be replenished at the first replenishment point to reach the second replenishment point,
   wherein the first replenishment point and the second replenishment point are selected by the server, and the second replenishment point is located far apart from the first replenishment point with respect to the vehicle and provides the power source less expensively than at the first replenishment point.

20. A control method of a portable communication terminal capable of communicating with a server and a vehicle, the method comprising:
   acquiring current location information and destination information of the vehicle;
   acquiring power source level information representing a remaining level of a power source of the vehicle;
   transmitting the current location information, the destination information, and the power source level information to the server;
   presenting, to a user, information representing a route for said vehicle to reach a second replenishment point via a first replenishment point and a minimum necessary replenishment amount of the power source to be replenished at the first replenishment point to reach the second replenishment point, wherein the second replenishment point is located far apart from the first replenishment point with respect to the vehicle and provides the power source less expensively than at the first replenishment point.

21. A non-transitory computer readable medium storing a control program of a portable communication terminal capable of communicating with a server and a vehicle, the program causing a computer to execute a method comprising:
   acquiring current location information and destination information of the vehicle;
   acquiring power source level information representing a remaining level of a power source of the vehicle;
   transmitting the current location information, the destination information, and the power source level information to the server; and
   presenting, to a user, information representing a route for said vehicle to reach a second replenishment point via a first replenishment point and a minimum necessary replenishment amount of the power source to be replenished at the first replenishment point to reach the second replenishment point, wherein the second replenishment point is located far apart from the first replenishment point with respect to the vehicle and provides the power source less expensively than at the first replenishment point.

22. A server comprising:
   a receiver that receives current location information and destination information of a vehicle and power source level information representing a remaining level of a power source of the vehicle from a portable communication terminal connected to the vehicle;

an accumulator that accumulates past driving history information using the vehicle and a plurality of replenishment enable points representing positions where the power source of the vehicle can be replenished;

a selector that selects, based on the current location information, the destination information, and the power source level information, which are received, and the accumulated driving history information, a replenishment point representing a position where the power source of the vehicle should be replenished from the plurality of replenishment enable points;

a transmitter that transmits information about the selected replenishment point to the portable communication terminal; and a generator that generates, when said selector selects a first replenishment point and a second replenishment point that is located far apart from the first replenishment point with respect to the vehicle and that provides the power source less expensively than at the first replenishment point, information representing a route for said vehicle to reach the second replenishment point via the first replenishment point and a minimum necessary replenishment amount of the power source to be replenished at the first replenishment point to reach the second replenishment point.

23. The server according to claim 22, further comprising:
a deriver that derives driving route information up to the destination based on the destination information and the current location information
wherein the generator generates replenishment point guide information including the selected replenishment point and the driving route information up to the destination.

24. The server according to claim 23, wherein said generator generates, as the replenishment point guide information, three-dimensional image information indicating the replenishment point on the driving route.

25. The server according to claim 22, wherein the driving history information includes past driving date/time information, driving route information, driving speed information, and driving state information of the vehicle,
said accumulator accumulates past driving state information of the vehicle, and
said selector selects the replenishment point from the plurality of replenishment enable points registered in advance, further based on the past driving state information and the current driving state information.

26. The server according to claim 25, wherein the driving state information includes at least one of driving environment information about a driving environment of the vehicle, traffic information about a traffic jam/traffic restriction, and vehicle maintenance information about maintenance of the vehicle.

27. The server according to claim 23, wherein said selector selects the replenishment point at one of a timing when the driving distance of the vehicle reaches a predetermined distance and a timing when the driving time of the vehicle reaches a predetermined time, and
said generator generates the replenishment point guide information anew based on the replenishment point selected according to a correspondence relationship with one of the driving distance and the driving time.

28. The server according to claim 22, wherein said accumulator accumulates the past driving state information of one of a vehicle of the same model as the vehicle and a vehicle having the same performance in terms of driving capability as the vehicle in addition to a past driving state information of the vehicle, and said selector selects the replenishment point from a plurality of replenishment enable points registered in advance, based on the past driving state information and a current driving state information of one of the vehicle of the same model as the vehicle and the vehicle having the same performance in terms of driving capability as the vehicle.

29. The server according to claim 22, wherein said accumulator further accumulates attribute information of each of the plurality of replenishment enable points, and
said selector selects, further based on the attribute information, the replenishment point representing the position where the power source of the vehicle should be replenished.

30. A control method of a server, comprising:
receiving current location information and destination information of a vehicle and power source level information representing a remaining level of a power source of the vehicle from a portable communication terminal connected to the vehicle;
selecting, based on past driving history information accumulated in the server in advance, the destination information, and the current location information, a replenishment point representing a position where the power source of the vehicle can be replenished;
transmitting information about the selected replenishment point to the portable communication terminal; and
generating, when a first replenishment point and a second replenishment point have been selected, and the second replenishment point is located far apart from the first replenishment point with respect to the vehicle and provides the power source less expensively than at the first replenishment point, information representing a route for said vehicle to reach the second replenishment point via the first replenishment point and a minimum necessary replenishment amount of the power source to be replenished at the first replenishment point to reach the second replenishment point.

31. A non-transitory computer readable medium storing a control program of a server, the program causing a computer to execute a method comprising:
receiving current location information and destination information of a vehicle and power source level information representing a remaining level of a power source of the vehicle from a portable communication terminal connected to the vehicle;
selecting, based on past driving history information accumulated in the server in advance, the destination information, and the current location information, a replenishment point representing a position where the power source of the vehicle can be replenished;
transmitting information about the selected replenishment point to the portable communication terminal; and
generating, when a first replenishment point and a second replenishment point have been selected, and the second replenishment point is located far apart from the first replenishment point with respect to the vehicle and provides the power source less expensively than at the first replenishment point, information representing a route for said vehicle to reach the second replenishment point via the first replenishment point and a minimum necessary replenishment amount of the power source to be replenished at the first replenishment point to reach the second replenishment point.

* * * * *